US012390394B2

(12) United States Patent
Asinkar et al.

(10) Patent No.: US 12,390,394 B2
(45) Date of Patent: Aug. 19, 2025

(54) WASHBASIN INCORPORATING STEAM GENERATOR

(71) Applicant: Kohler India Corporation Pvt Ltd, Delhi (IN)

(72) Inventors: Anand Asinkar, Delhi (IN); Fateh Singh Virk, Delhi (IN); Rahul Wadhawan, Delhi (IN)

(73) Assignee: Kohler India Corporation Pvt Ltd., New Delhi (IN)

( * ) Notice: Subject to any disclaimer, the term of this patent is extended or adjusted under 35 U.S.C. 154(b) by 139 days.

(21) Appl. No.: 18/224,299

(22) Filed: Jul. 20, 2023

(65) Prior Publication Data

US 2024/0390225 A1 Nov. 28, 2024

(30) Foreign Application Priority Data

May 27, 2023 (IN) ............................. 202311036754

(51) Int. Cl.
*A61H 33/06* (2006.01)
*E03C 1/14* (2006.01)

(52) U.S. Cl.
CPC ............. *A61H 33/065* (2013.01); *E03C 1/14* (2013.01); *A61H 2033/068* (2013.01)

(58) Field of Classification Search
CPC .. A61H 33/065; A61H 2033/068; E03C 1/14; A47K 1/04; F22B 33/00; F22B 37/00
USPC ...................... 4/535, 524; 607/81; 126/350.2
See application file for complete search history.

(56) References Cited

U.S. PATENT DOCUMENTS

| | | | | |
|---|---|---|---|---|
| 2,961,525 | A | 11/1960 | Frederick | |
| 5,343,552 | A | 8/1994 | Peteri et al. | |
| 9,364,116 | B2 | 6/2016 | Waldron | |
| 9,603,482 | B2 | 3/2017 | Mchale | |
| 9,999,565 | B2 | 6/2018 | Urfig | |
| 10,640,393 | B2 | 5/2020 | Cobb et al. | |
| 11,317,758 | B2 | 5/2022 | Beschi | |
| 11,591,746 | B2 * | 2/2023 | Woo | D06F 58/203 |

(Continued)

FOREIGN PATENT DOCUMENTS

| | | | | |
|---|---|---|---|---|
| CH | 716647 A2 * | 3/2021 | | A47K 4/00 |
| CN | 104138230 A * | 11/2014 | | A47K 4/00 |

(Continued)

OTHER PUBLICATIONS

Elitesteam Website "Elitesteam 12KW Steam Generator Kit" https://www.elitesteam.com/product/elitesteam-12kw-package/?gclid=Cj0KCQjwk7ugBhDIARIsAGuvgPZsWniflzCBvkVKmzKz_X4f8Rqzh2NrFo5BQf0GArQ4-D-eGt5gC0aAiLEALw_wcB, Retrieved Mar. 14, 2023, pp. 1-6.

(Continued)

*Primary Examiner* — Lori L Baker
(74) *Attorney, Agent, or Firm* — Lempia Summerfield Katz LLC

(57) ABSTRACT

A washbasin having a basin and a steam generator. The basin has a drain and a basin steam outlet. The steam generator has a water inlet, a tank configured to store water received at the water inlet, a heater configured to heat the water to generate steam, and a generator steam outlet configured to output the steam. Coupling elements couple the steam generator to the basin and a steam outlet conduit fluidly connects the generator steam outlet to the basin steam outlet. The basin steam outlet is located on a rear wall of the basin.

20 Claims, 29 Drawing Sheets

(56) References Cited

U.S. PATENT DOCUMENTS

| | | | | |
|---|---|---|---|---|
| 2007/0061958 | A1* | 3/2007 | Ye | F24H 1/26 4/524 |
| 2007/0147808 | A1 | 6/2007 | Egeresi | |
| 2011/0113545 | A1* | 5/2011 | Driessen | B60R 9/06 4/476 |
| 2011/0174839 | A1 | 7/2011 | Lin | |
| 2011/0219824 | A1* | 9/2011 | Lee | F22B 1/284 122/13.01 |
| 2018/0030640 | A1* | 2/2018 | Chen | D06F 39/40 |
| 2021/0077346 | A1* | 3/2021 | Luong | A47C 1/04 |
| 2022/0081885 | A1 | 3/2022 | Leighton | |
| 2024/0159391 | A1* | 5/2024 | Cho | D06F 39/04 |

FOREIGN PATENT DOCUMENTS

| | | | | | |
|---|---|---|---|---|---|
| CN | 108784627 | A | | 11/2018 | |
| CN | 108903704 | A | | 11/2018 | |
| CN | 113832667 | A | * | 12/2021 | A47K 4/00 |
| CN | 215443314 | U | * | 1/2022 | A47K 4/00 |
| CN | 114222887 | A | * | 3/2022 | D06F 39/40 |
| DE | 19907049 | A1 | * | 8/2000 | A47J 27/04 |
| EP | 3017745 | A2 | * | 5/2016 | A47L 11/4086 |
| EP | 3141837 | A1 | | 3/2017 | |
| EP | 3771769 | A1 | * | 2/2021 | D06F 39/40 |
| JP | 3591262 | | | 11/2004 | |
| JP | 5511011 | | | 6/2014 | |
| KR | 20130011371 | | | 1/2013 | |
| WO | WO-2018170259 | A1 | * | 9/2018 | A47L 11/28 |
| WO | WO-2023003163 | A1 | * | 1/2023 | D06F 39/04 |
| WO | WO-2024060475 | A1 | * | 3/2024 | A47K 4/00 |

OTHER PUBLICATIONS

Built with Ferguson Website “SteamSpa Oasis 7.5 KW QuickStart Steam Bath Generator Package Model:OA750CH” https://www.build.com/product/summary/1068402?uid=2575869&jmtest=gg-gbav2_2575869&inv2=1&&&&&source=gg-gba-pla_2575869!c1707632291!a68158365498!dc!ng&gclid=Cj0KCQjwk7ugBhDIARIsAGuvgPbReornIBblFAz4oVDCKhUFLIbHKL9fQBCV-fTSkOhMsqrrirRHzY0aAvZLEALw_wcB&gclsrc=aw.ds, Retrieved Mar. 14, 2023, pp. 1-1.

Advance Plumbing and Heating Supply Webssite “Mr. Staem” https://www.advanceplumbing.com/Mr-steam-Steam-shower-generators-v14.htm, Retrieved Mar. 14, 2023, pp. 1-2.

* cited by examiner

WASHBASIN INCORPORATING STEAM GENERATOR

CROSS REFERENCE TO PRIOR APPLICATIONS

This application claims priority to Indian Patent Application No. 202311036754, filed May 27, 2023, hereby incorporated by reference in its entirety.

BACKGROUND

The present invention generally relates to washbasins, and more particularly to washbasins incorporating a steam generator.

Washbasins may be utilized in washrooms and other lavatory areas such as bathrooms, water closets, and the like. In many implementations, steam generation is also desirable within these lavatory areas. While separate steam generators may be provided, these require separate installations and take up valuable space within the lavatory area.

Improvements are desired to allow easier and more compact installation of steam generator. Improvements are also desired to facilitate streamlined interfaces for steam generators.

SUMMARY

The present application discloses a washbasin having a basin, a steam generator, coupling elements, and a steam outlet conduit. The basin has a drain and a basin steam outlet. The steam generator has a water inlet, a tank configured to store water received at the water inlet, a heater configured to heat the water to generate steam, and a generator steam outlet configured to output the steam. The coupling elements couple the steam generator to the basin. The steam outlet conduit fluidly connects the generator steam outlet to the basin steam outlet. The basin steam outlet is located on a rear wall of the basin.

The present application also discloses a method of generating steam. First, a washbasin is provided, the washbasin having a basin and a steam generator coupled to the basin. Second, steam is generated within the steam generator. Third, steam is transmitted from a generator steam outlet of the steam generator to a basin steam outlet via a steam outlet conduit. The basin steam outlet is positioned on a rear wall of the basin.

The present application also discloses a washbasin having a basin, a steam generator, coupling elements, and a steam outlet conduit. The basin has a drain, a basin steam outlet, a front portion, and a rear portion. The front portion and the rear portion are located on opposite sides of the drain. The steam generator has a water inlet, a tank configured to store water received at the water inlet, a heater configured to heat the water to generate steam, and a generator steam outlet configured to output the steam. The coupling elements couple the steam generator to the basin. The steam outlet conduit fluidly connects the generator steam outlet to the basin steam outlet. The steam generator is suspended beneath the front portion of the basin by the coupling elements, the steam outlet conduit extending from beneath the front portion of the basin to the basin steam outlet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
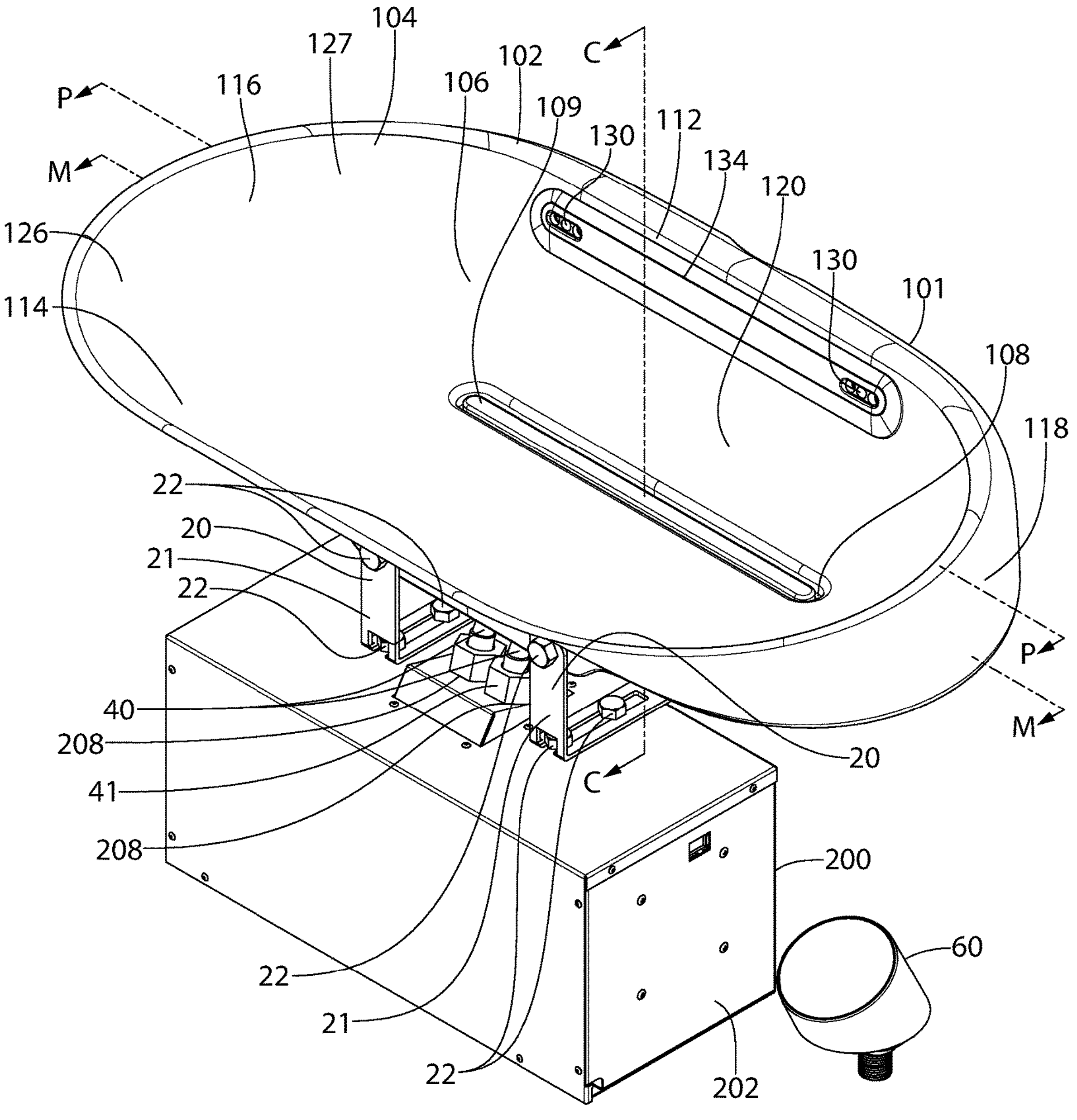
FIG. 1 is a perspective view of a washbasin according to the present disclosure.
Figure 2:
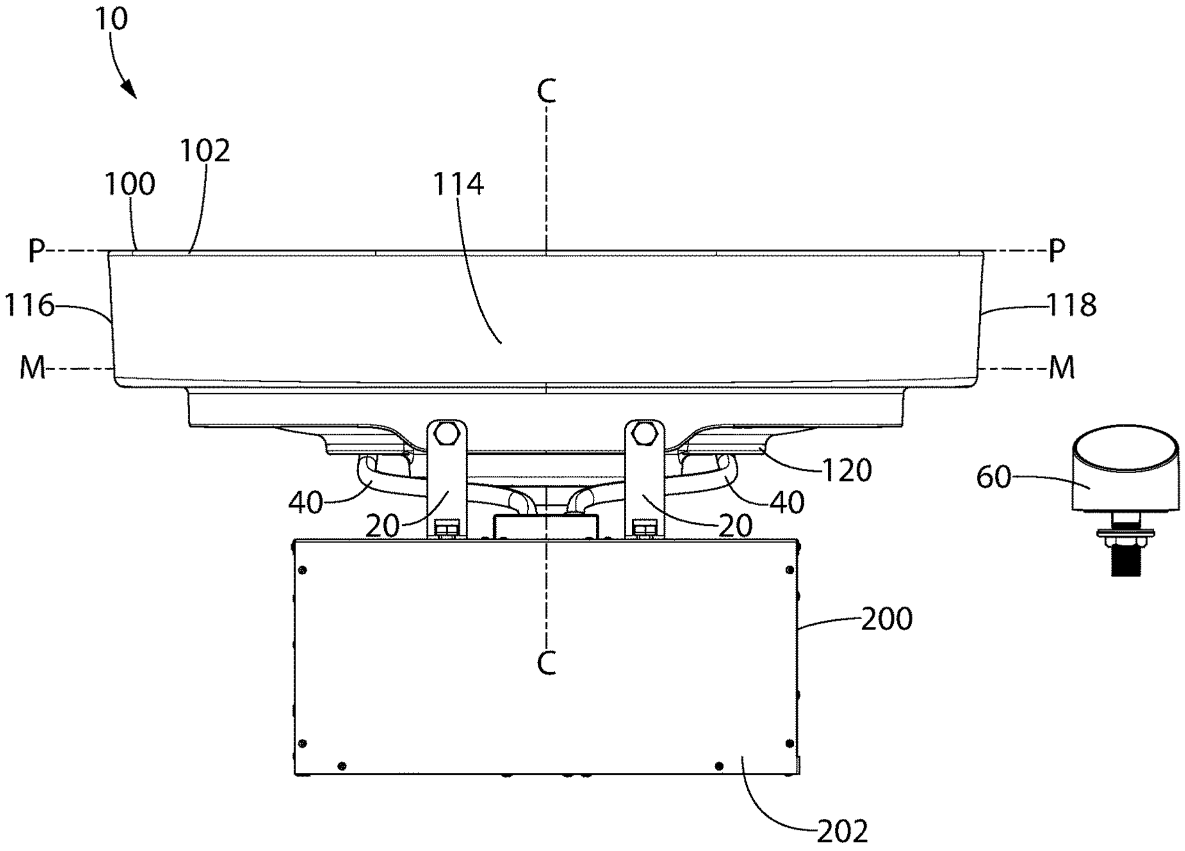
FIG. 2 is a front view thereof.
Figure 3:
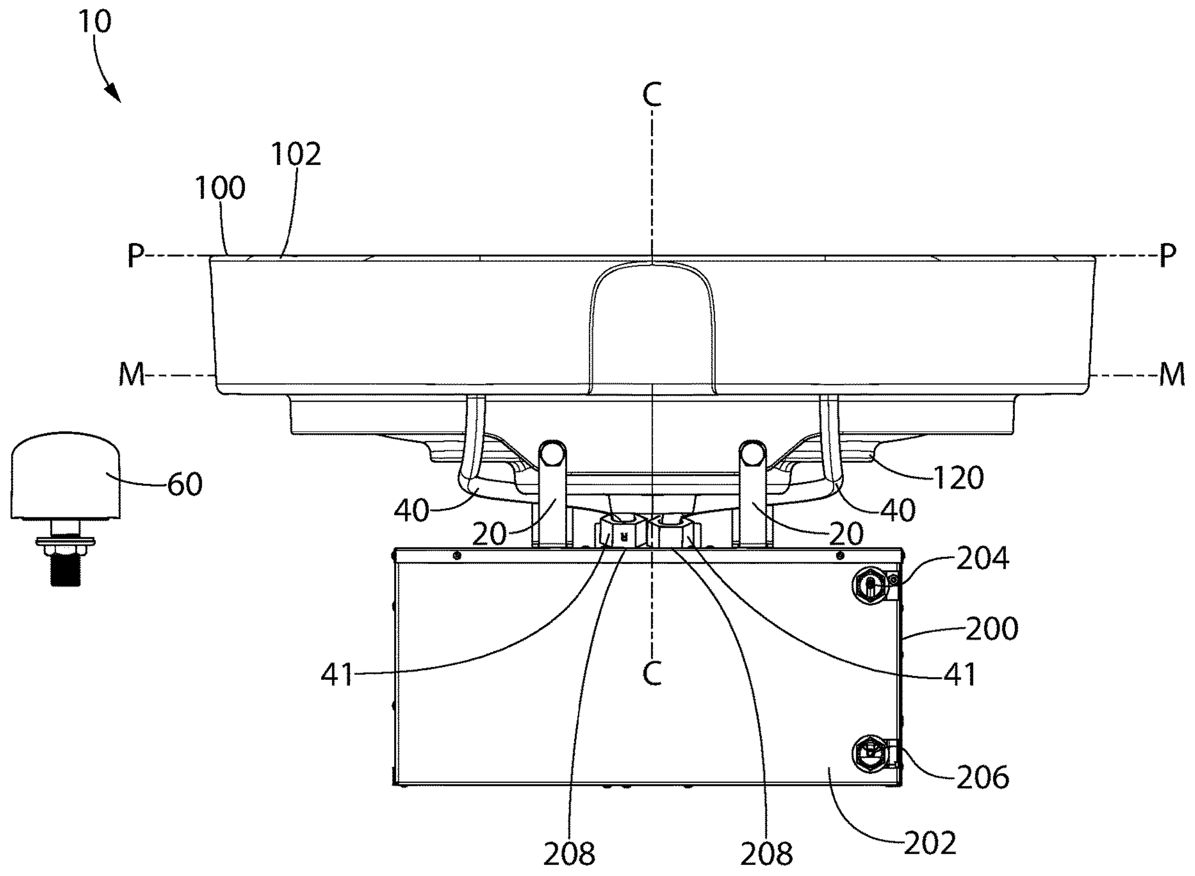
FIG. 3 is a rear view thereof.
Figure 4:
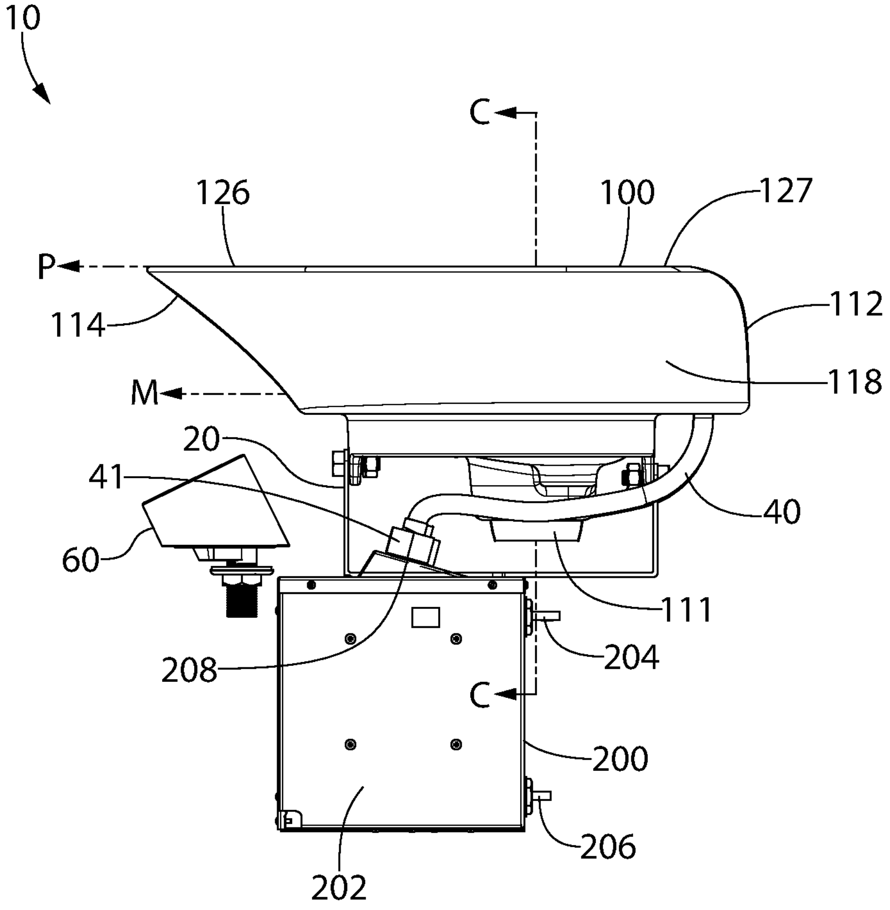
FIG. 4 is a right view thereof.
Figure 5:
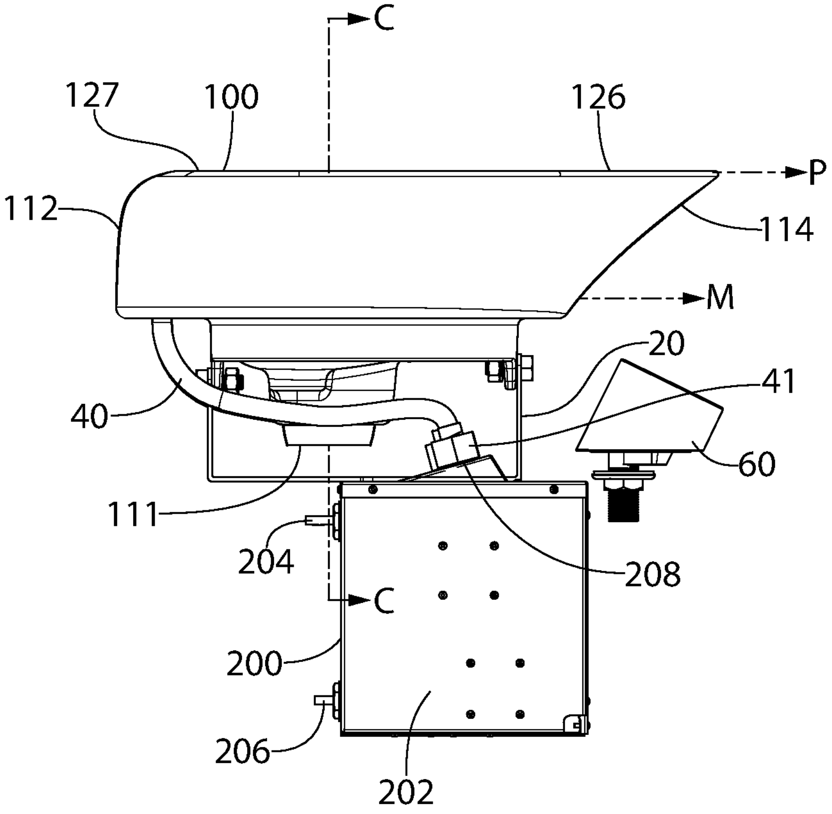
FIG. 5 is a left view thereof.
Figure 6:
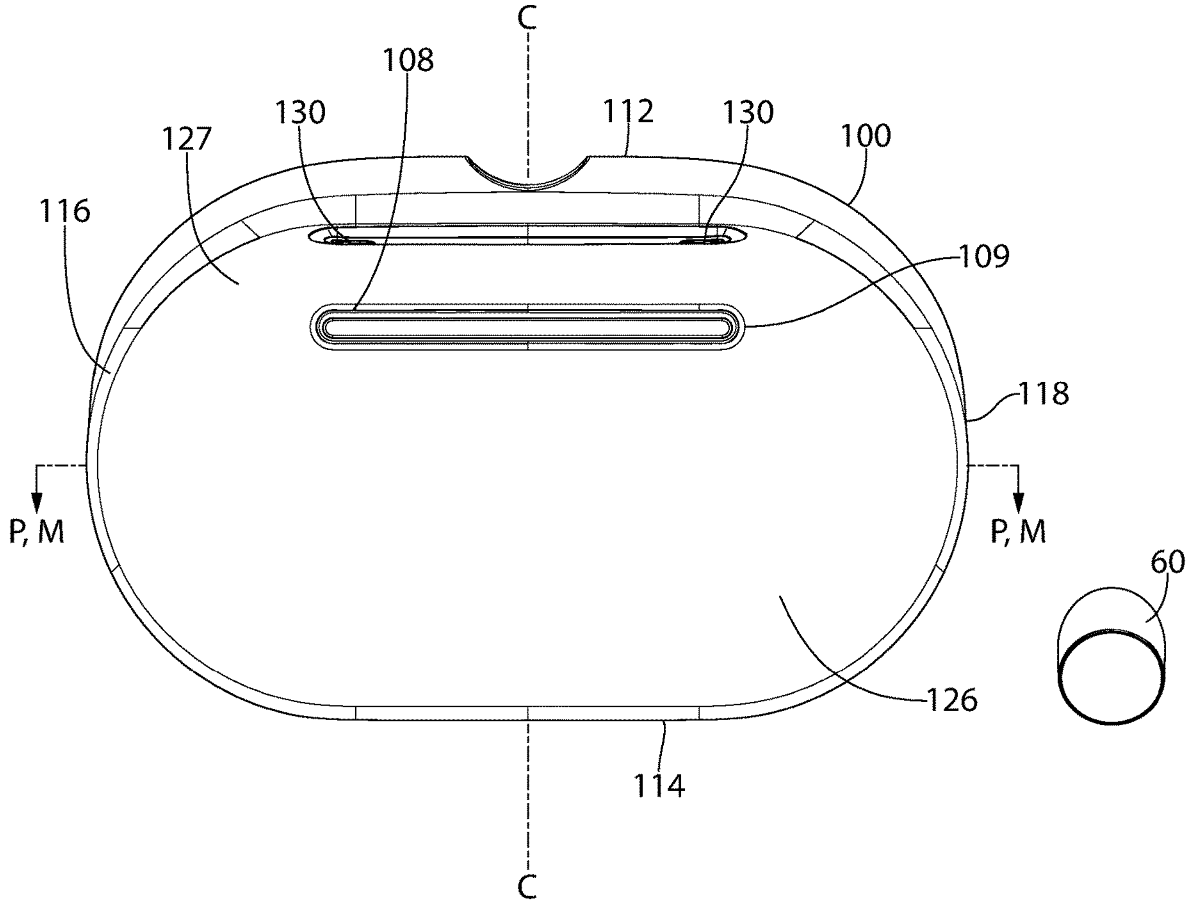
FIG. 6 is top view thereof.
Figure 7:
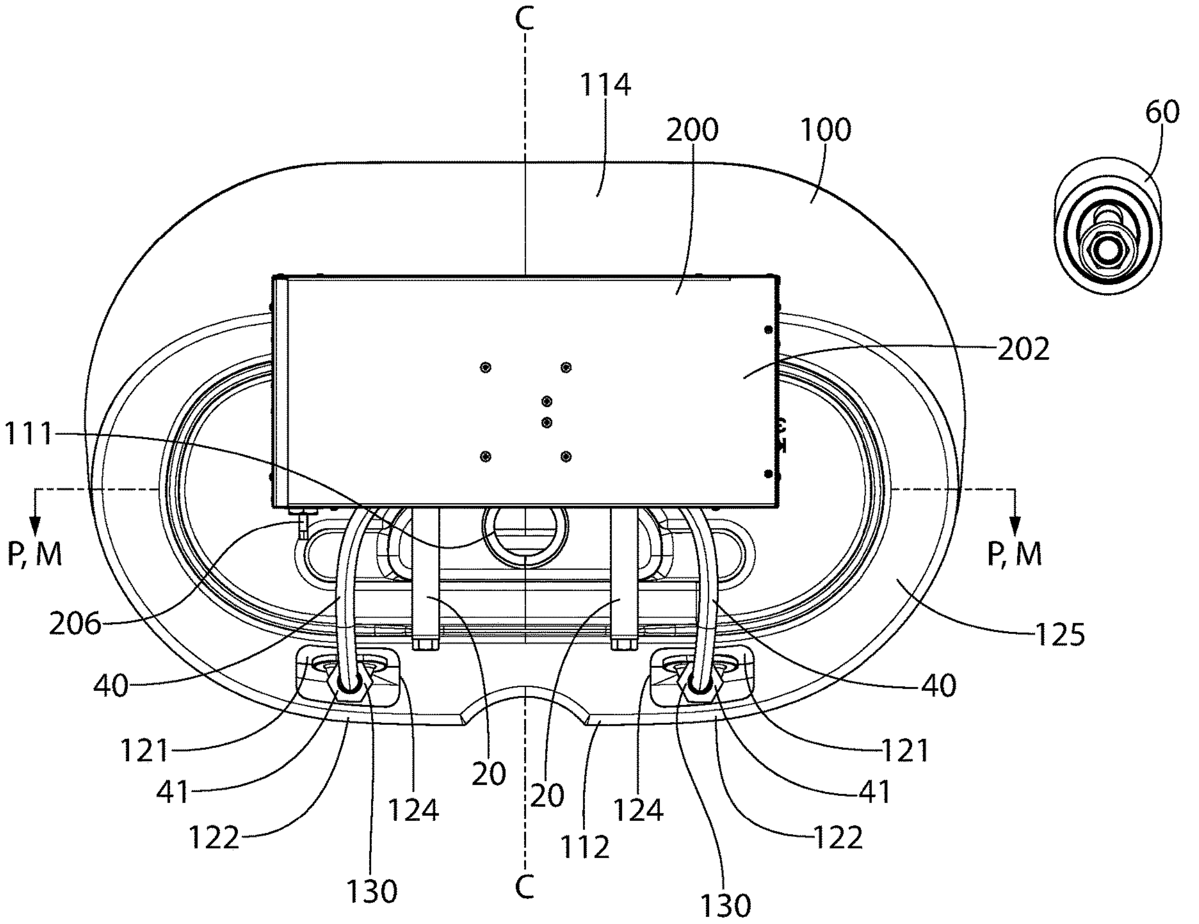
FIG. 7 is a bottom view thereof.
Figure 8:
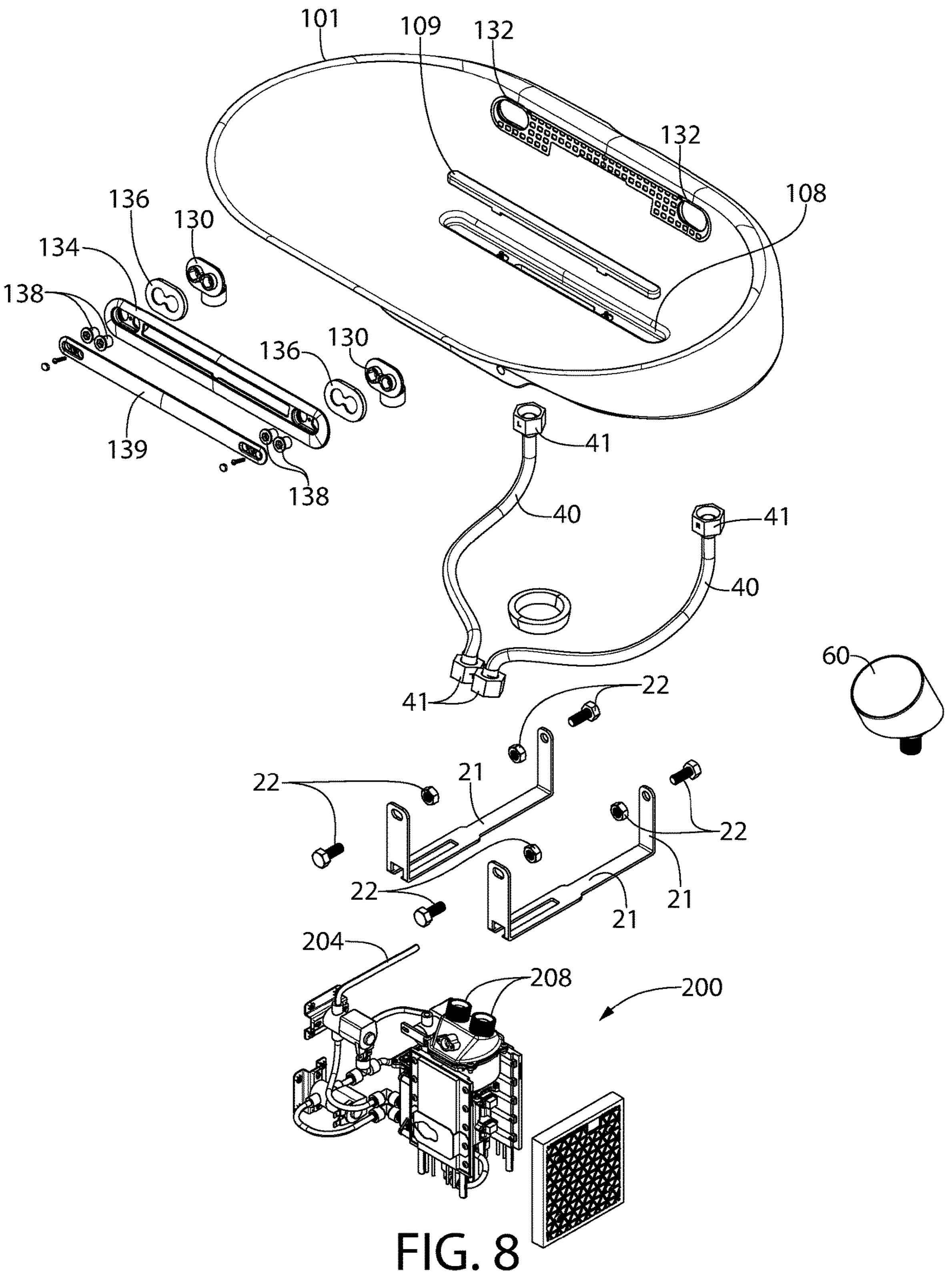
FIG. 8 is an exploded view thereof.

All drawings are schematic and not necessarily to scale. Features shown numbered in certain figures which may appear un-numbered in other figures are the same features unless noted otherwise herein.

DETAILED DESCRIPTION

The features and benefits of the invention are illustrated and described herein by reference to non-limiting examples in which aspects of the disclosure may be embodied. This description of examples is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

FIGS. 1-8 show a washbasin 10 incorporating a basin 100, a steam generator 200, a plurality of coupling elements 20, first and second steam outlet conduits 40, and a control panel 60. The basin 100 is coupled to the steam generator 200 by the plurality of coupling elements 20, the plurality of coupling elements 20 comprising brackets 21 and fasteners 22. The coupling elements 20 may be formed of sheet metal, plastic, or any other desired material and may be used to mount the steam generator 200 to the basin 100. In other configurations, only a single bracket 21 may be used. Further optionally, the fasteners 22 may be snap features on the brackets 21 to enable simple and secure installation while reducing component count.

The basin 100 has a top edge 102 defining an opening 104 to a cavity 106. The cavity 106 is configured to collect water or other liquids. The top edge 102 may define a top plane P-P. The top plane P-P is in surface contact with the top edge 102. An entirety of the top edge 102 may be in contact with the top plane P-P or only a portion of the top edge 102 may be in contact with the top plane P-P. No portion of the top edge 102 extends beyond the top plane P-P. Otherwise stated, the entirety of the basin 100 is below the top plane P-P and no part of the top plane P-P extends through the basin 100. The top plane P-P comes in contact with the basin 100 but does not extend through the basin 100.

The cavity 106 of the basin 100 is defined by an inner surface 110 formed by a plurality of walls of the basin 100. The cavity 106 extends from the opening 104 at the top edge 102 to a drain 108, the drain 108 located in a floor 120 of the basin 100. The basin 100 has a rear wall 112, a front wall 114 opposite the rear wall 112, and left and right walls 116, 118. The rear wall 112, front wall 114, and left and right walls 116, 118 meet at the floor 120. The drain 108 is formed into the floor 120 and extends through the floor 120 to a drain outlet 111 located beneath the floor 120. The drain 108 may have a cover 109 or may simply be a hole connecting to the drain outlet 111 which receives a drain pipe or other plumbing conduit. The cover 109 may serve as a shield to prevent loss of larger items down the drain 108 by having a constriction in at least one dimension such as an elongated slot or other feature. The drain 108 may optionally be a plurality of holes which are coupled to the drain pipe instead of a single hole or aperture and the cover 109 may form a series of apertures or a single aperture when coupled to the drain 108, these apertures leading to the drain pipe.

A mid-plane M-M is located halfway between the drain 108 and the top plane P-P. The mid-plane M-M is parallel to the top plane P-P but is spaced from the top plane P-P. The mid-plane M-M is located exactly halfway from an opening to the drain 108 and the top plane P-P. In addition, a central plane C-C is located perpendicular to the top plane P-P, the basin 100 being symmetric about the central plane C-C. The central plane C-C extends through the drain 108, the rear wall 112, the front wall 114, and the floor 120.

The basin 100 has a main body 101 which may be formed of a ceramic material, a composite material comprising a resin, a metal material, or any other known material suitable for use in a wet environment. For instance, the basin 100 may be formed of a china or glass, a fiberglass material, or stainless steel. Any material may be used without limitation, so long as it does not degrade in the presence of water. Optionally, the basin 100 may have provisions for fitting a faucet. In other implementations, such as the one illustrated, the basin 100 may not have holes or other features configured to receive a faucet. Instead, the basin 100 may mount to a support structure and the faucet may also mount to the support structure.

The basin 100 further comprises first and second basin steam outlets 130, the basin steam outlets 130 located on the rear wall 112 of the basin 100. The basin steam outlets 130 are separate components which mount within holes 132 in the basin 100. A bezel 134 mounts to the basin steam outlets 130 to cover the holes 132. Sealing elements 136 seal the basin steam outlets 130 to the rear wall 112 of the basin 100. Grommets 138 extend through the bezel 134 and engage the basin steam outlets 130. A cover 139 is mounted to the bezel 134 to secure the grommets 138 and further cover portions of the bezel 134 and the basin steam outlets 130. The basin steam outlets 130 are configured for connection to the first and second steam outlet conduits 40. The basin steam outlets 130 may have a fitting 41 at each end. The fittings 41 may be threaded connection or any other suitable connection mechanism to provide a fluid-tight connection to the steam outlet conduits 40.

The basin steam outlets 130 are located above the mid-plane M-M and on opposite sides of the central plane C-C and may be inclined at an angle of approximately 6 degrees with respect to the top plane P-P. The basin steam outlets 130 are symmetric about the central plane C-C, between the mid-plane M-M and the top edge 102. Thus, the basin steam outlets 130 are located between the mid-plane M-M and the top plane P-P. The bezel 134 and cover 139 are also symmetric about the central plane C-C, but extend from one side of the central plane C-C to an opposite side of the central plane C-C, intersecting the central plane C-C. Optionally, the basin steam outlets 130 may be inclined at greater or less than 6 degrees in order to better direct steam toward a user. The drain 108 and cover 109 are also symmetrical about the central plane C-C and extend through the central plane C-C, intersecting the central plane C-C. In some other implementations, the bezel 134, cover 139, drain 108, and cover 109 may be multiple separate components which do not intersect the central plane C-C.

The rear wall 112 of the basin 100 is divided into an inner wall portion 121 and an outer wall portion 122. The inner wall portion 121 forms a portion of the inner surface 110. The outer wall portion 122 is spaced from the inner wall portion 121 to form a rear wall cavity 123. Apertures 124 are provided in the rear wall cavity 123. The apertures 124 extend through a lower portion 125 of the rear wall 112 and provide access to the inner wall portion 121. Thus, the rear wall 112 is formed such that the inner wall portion 121 joins the outer wall portion 122 at the top edge 102 of the basin 100.

The inner wall portion 121 and the outer wall portion 122 are also joined by the lower portion 125, the lower portion 125 opposite the top edge 102 of the basin 100. In other implementations, the rear wall 112 may be formed as a single wall with or without a lower portion 125. The basin steam outlets 130 are located within the rear wall cavity 123 and extend through the holes 132 of the basin 100. The holes 132 are formed through the inner wall portion 121, but do not extend through the outer wall portion 122 or the lower portion 125. The steam outlet conduits 40 extend through the apertures 124 into the rear wall cavity 123 and are coupled to the basin steam outlets 130 within the rear wall cavity 123.

The steam generator 200 comprises a housing 202, the housing 202 having a generally rectangular shape. The housing 202 is configured to receive the fasteners 22 which connect the brackets 21 to the housing 202. The steam generator 200 also comprises a water inlet 204, a water outlet 206, and first and second generator steam outlets 208. The housing 202 is omitted from FIG. 8 for the sake of better illustrating internal features of the steam generator 200.

The basin 100 has a front portion 126 and a rear portion 127. The front portion 126 and rear portion 127 are located on opposite sides of the drain 108. Thus, the front portion 126 extends from the drain 108 up to and including an entirety of the front wall 114. The rear portion 127 extends from the drain 108 up to and including an entirety of the rear wall 112. An entirety of the steam generator 200 is positioned below the front portion 126 of the basin 100. The steam outlet conduits 40 are positioned below both of the front portion 126 and the rear portion 127 of the basin 100, extending past and on lateral sides of the opening of the drain 108. The basin steam outlets 130 are located exclusively in the rear portion 127 of the basin 100.

Figure 9:
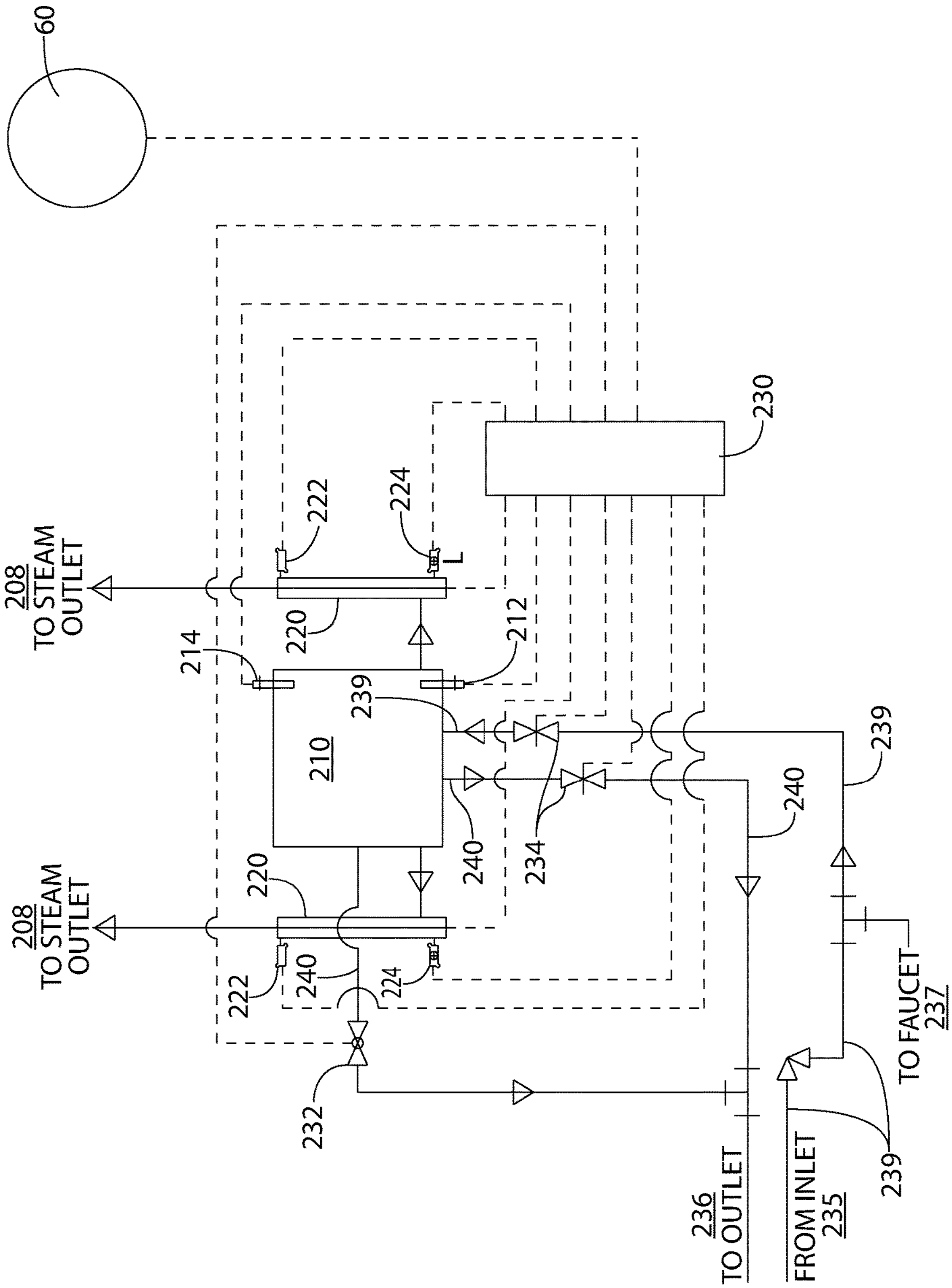
FIG. 9 is a schematic illustrating the plumbing and electrical routing thereof.
Figure 10:
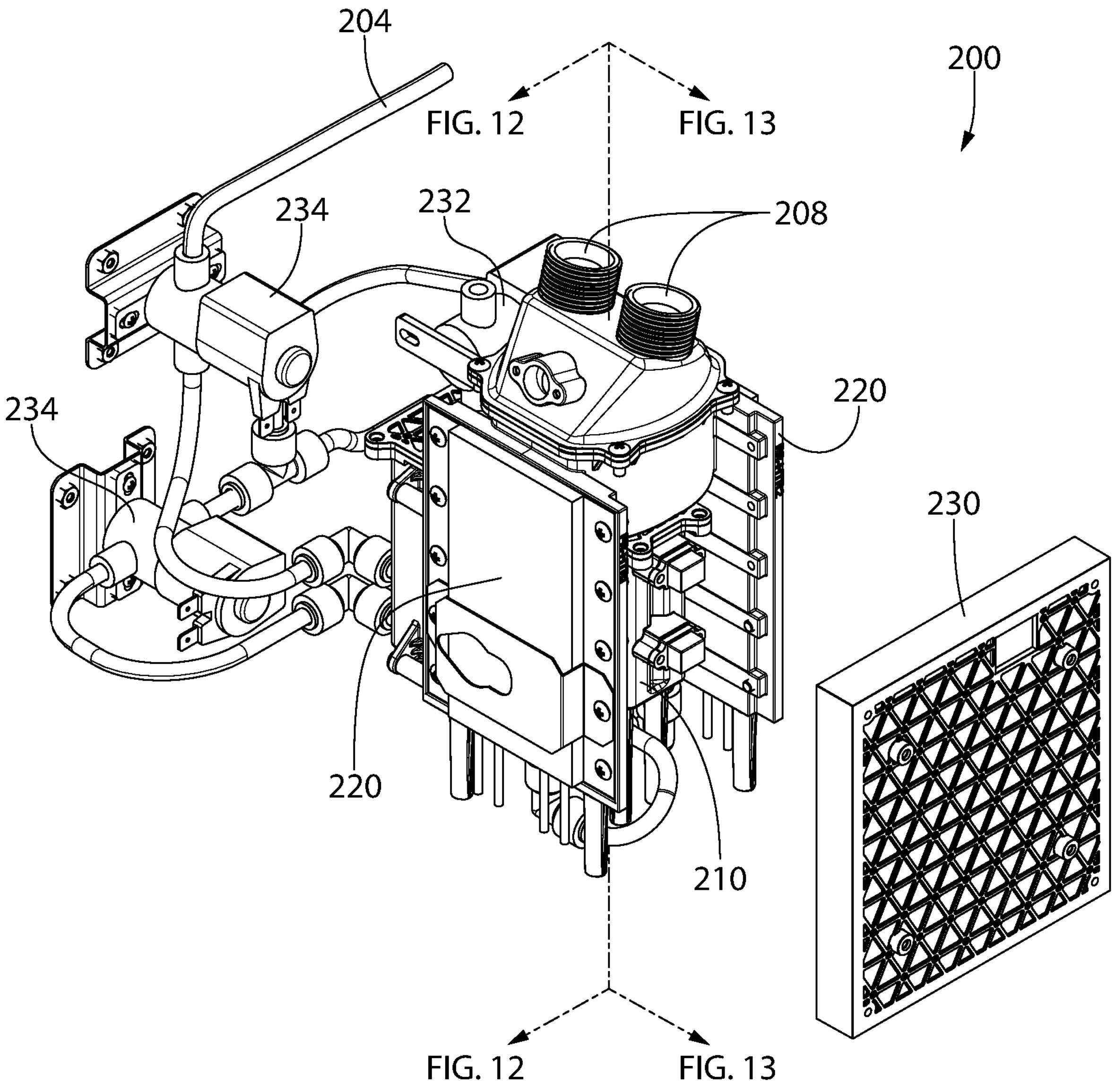
FIG. 10 is a perspective view of a portion of a steam generator of the washbasin of FIG. 1.
Figure 11:
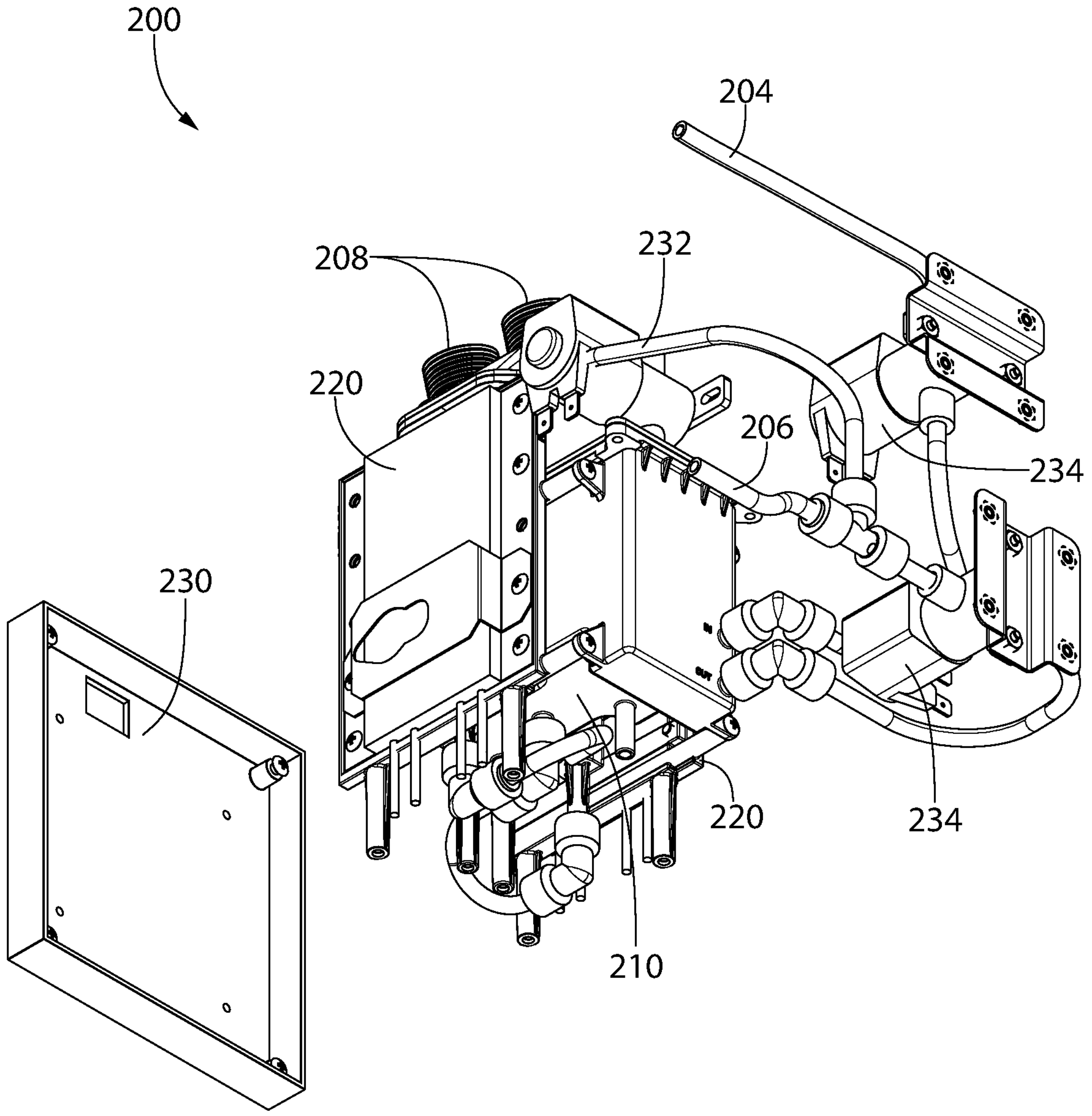
FIG. 11 is a bottom rear perspective view thereof.
Figure 12:
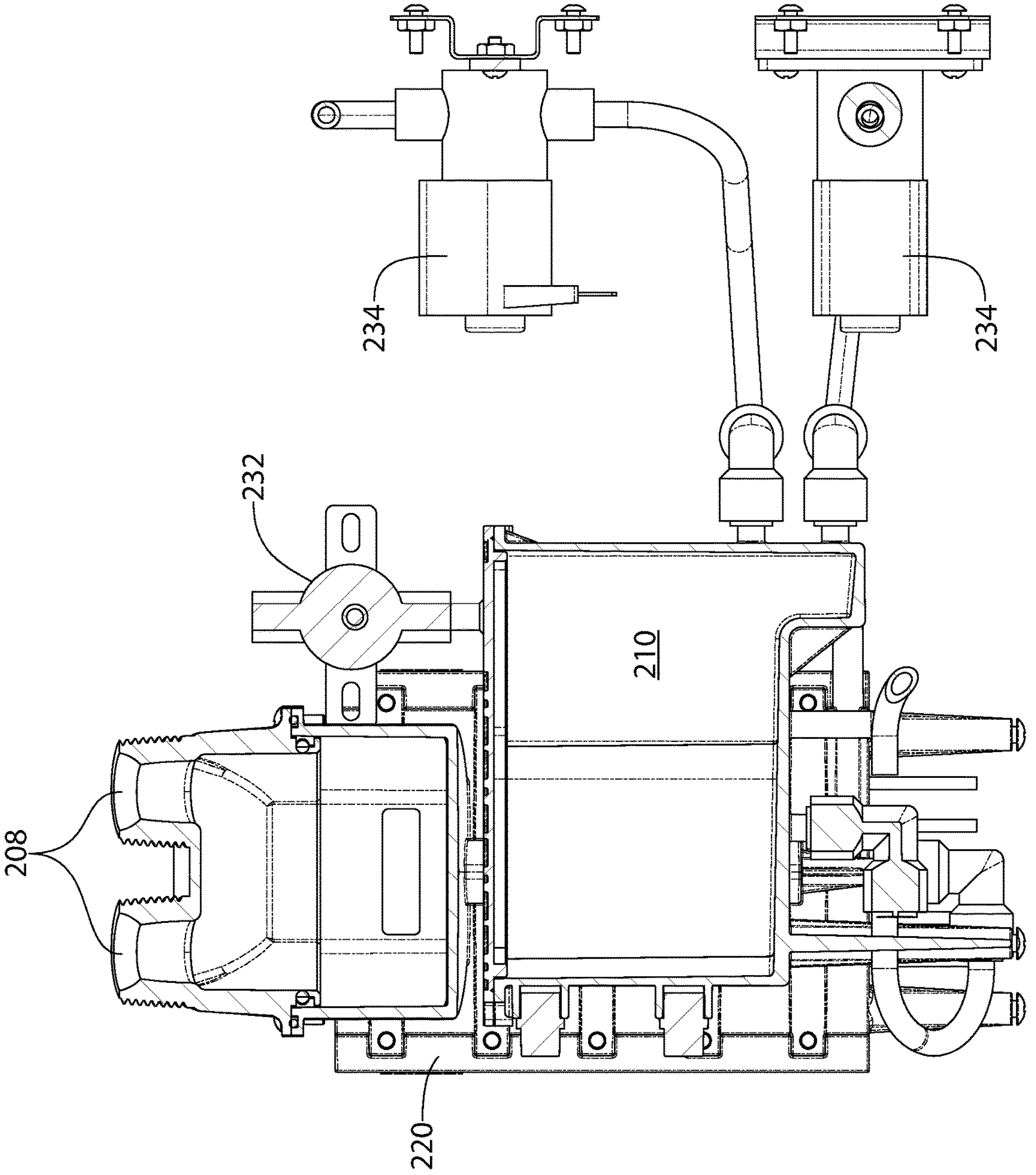
FIG. 12 is a cross-sectional view thereof, taken along line 12-12 of FIG. 10.
Figure 13:
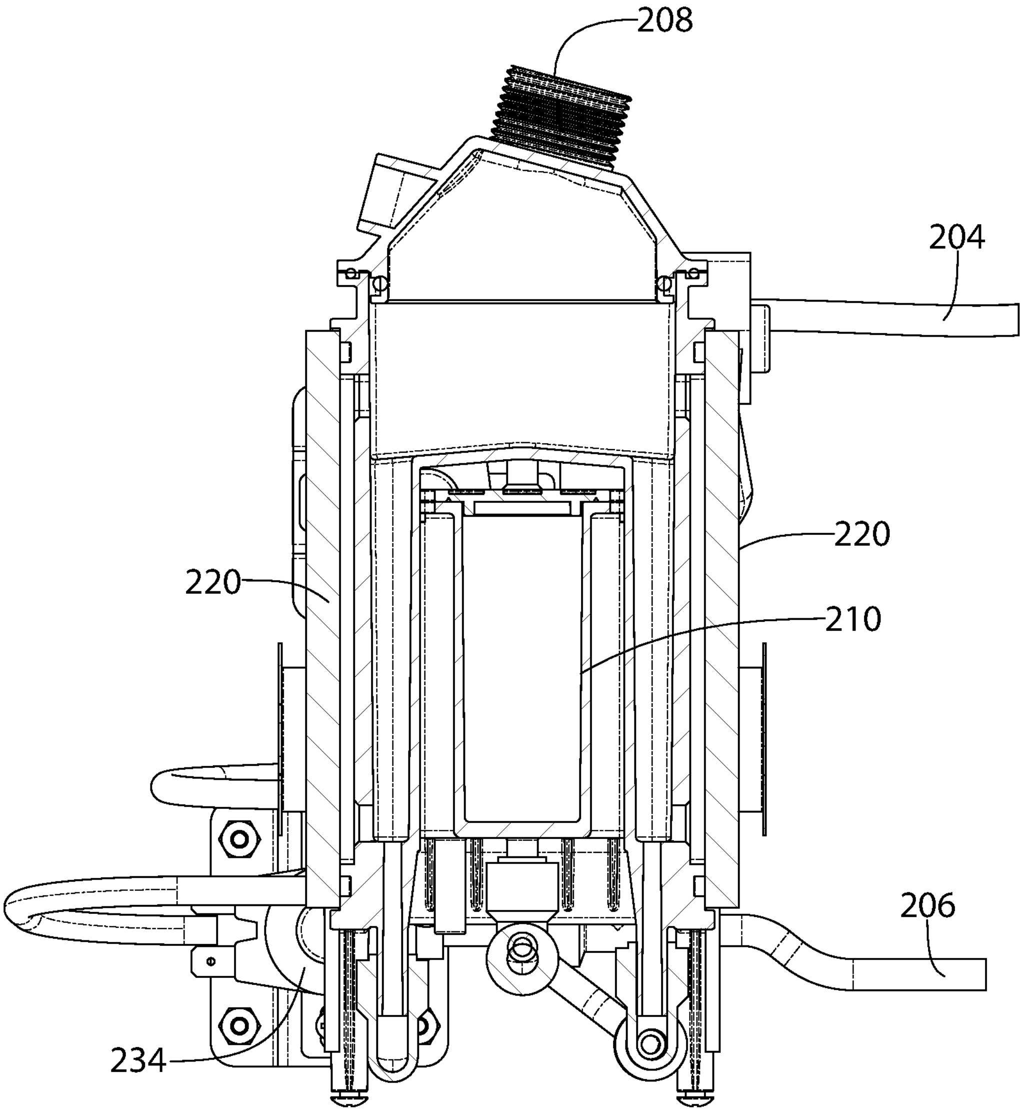
FIG. 13 is a cross-sectional view thereof, taken along line 13-13 of FIG. 10.
Figure 14:
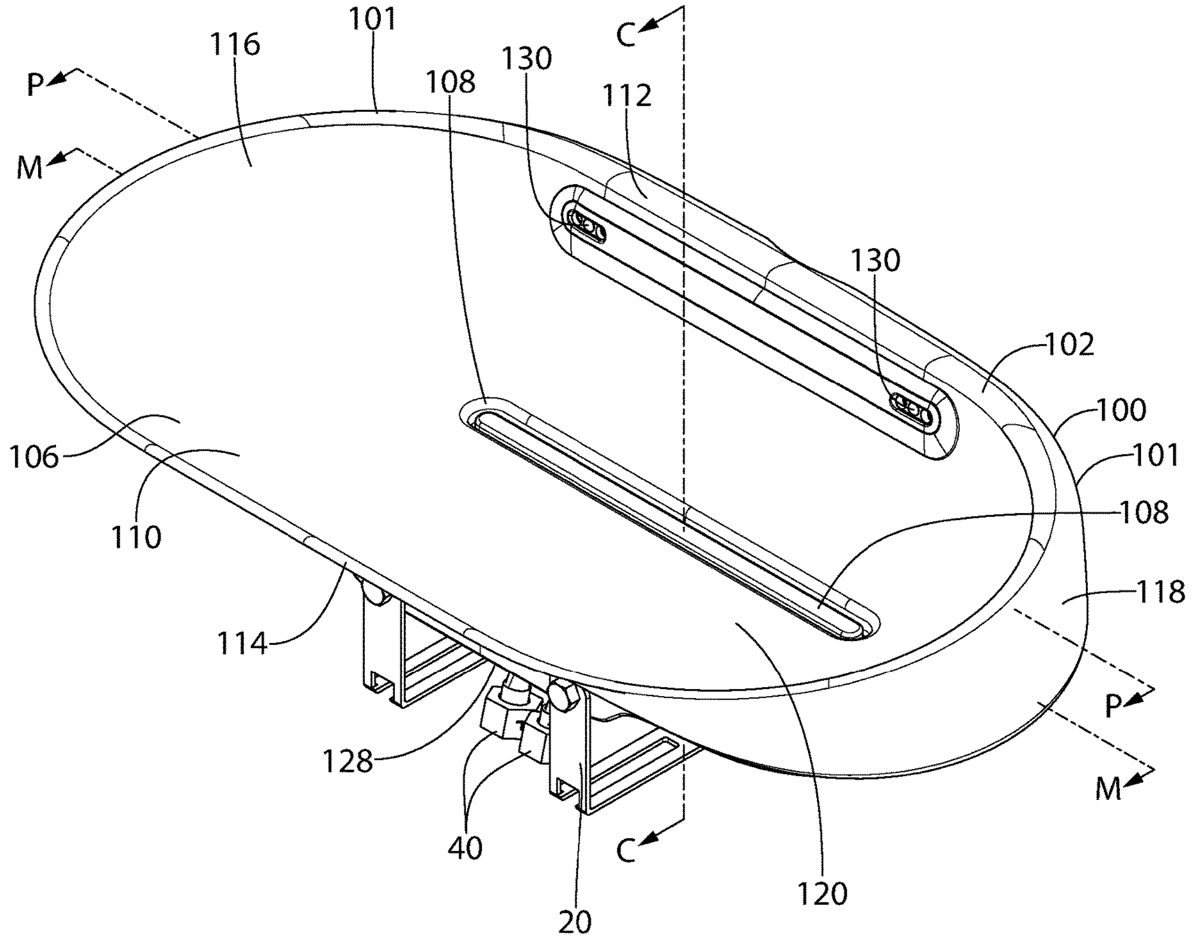
FIG. 14 is a perspective view of a basin of the washbasin of FIG. 1.
Figure 15:
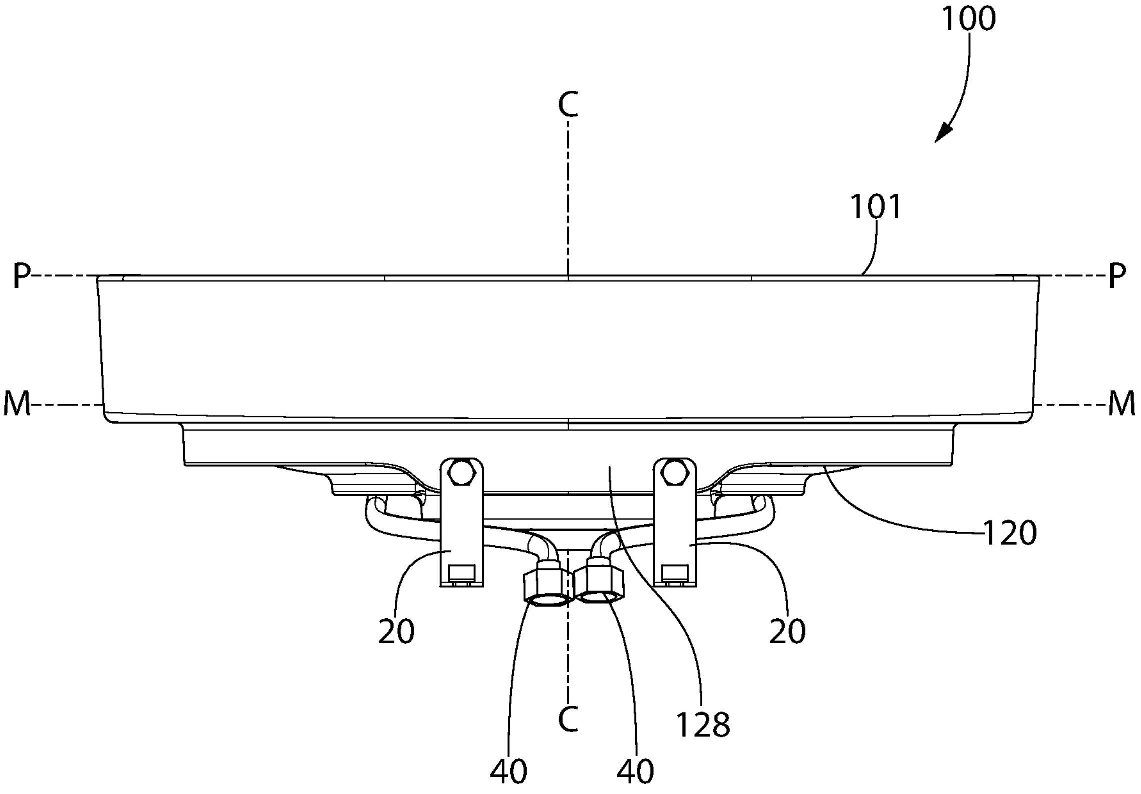
FIG. 15 is a front view thereof.
Figure 16:
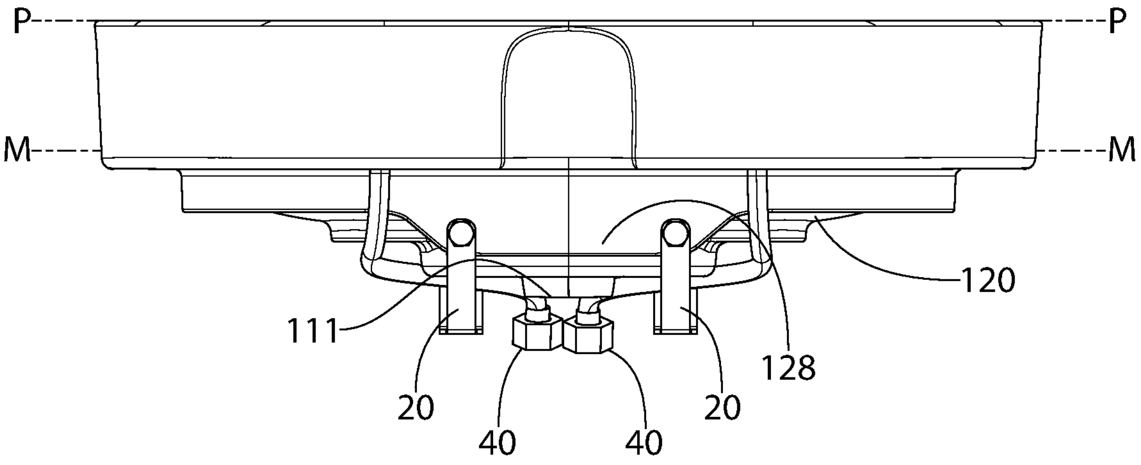
FIG. 16 is a rear view thereof.
Figure 17:
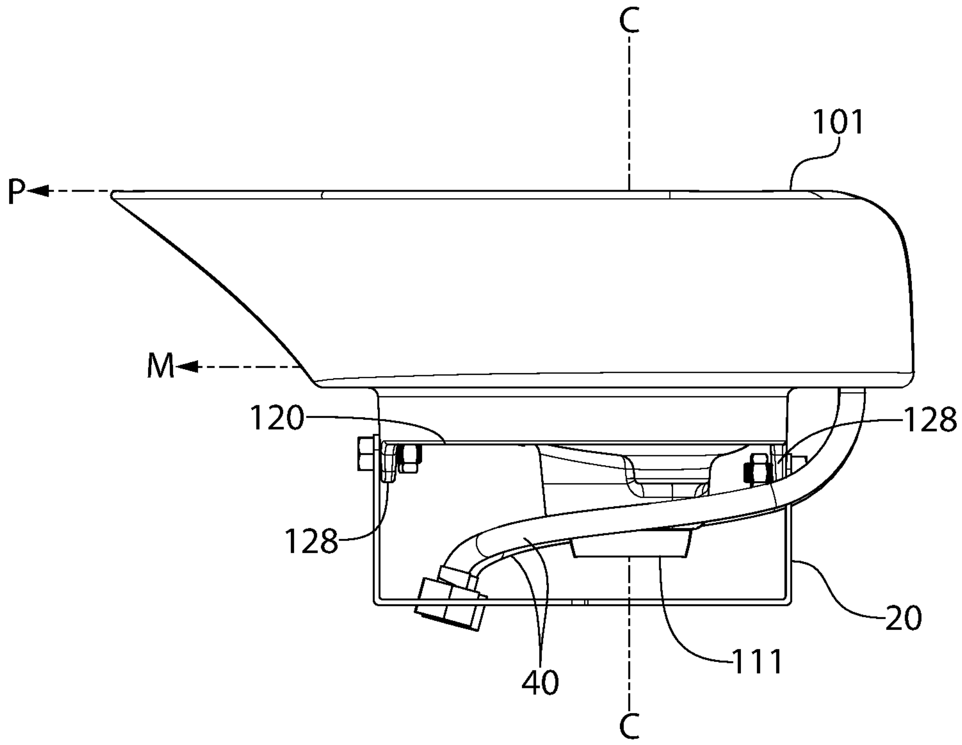
FIG. 17 is a right view thereof.
Figure 18:
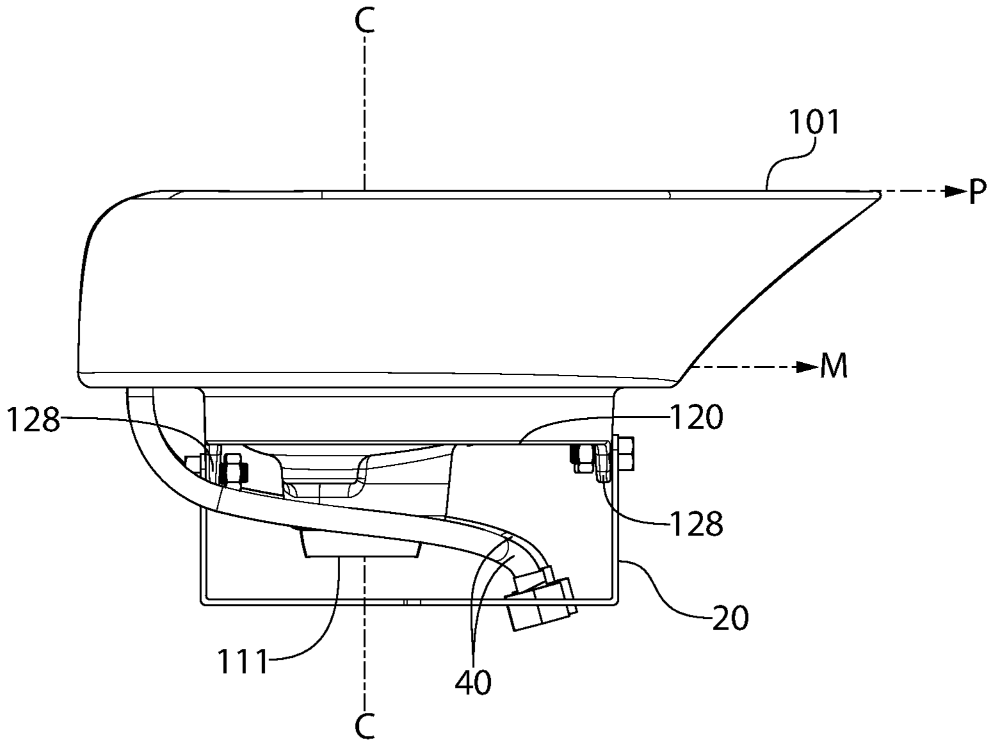
FIG. 18 is a left view thereof.
Figure 19:
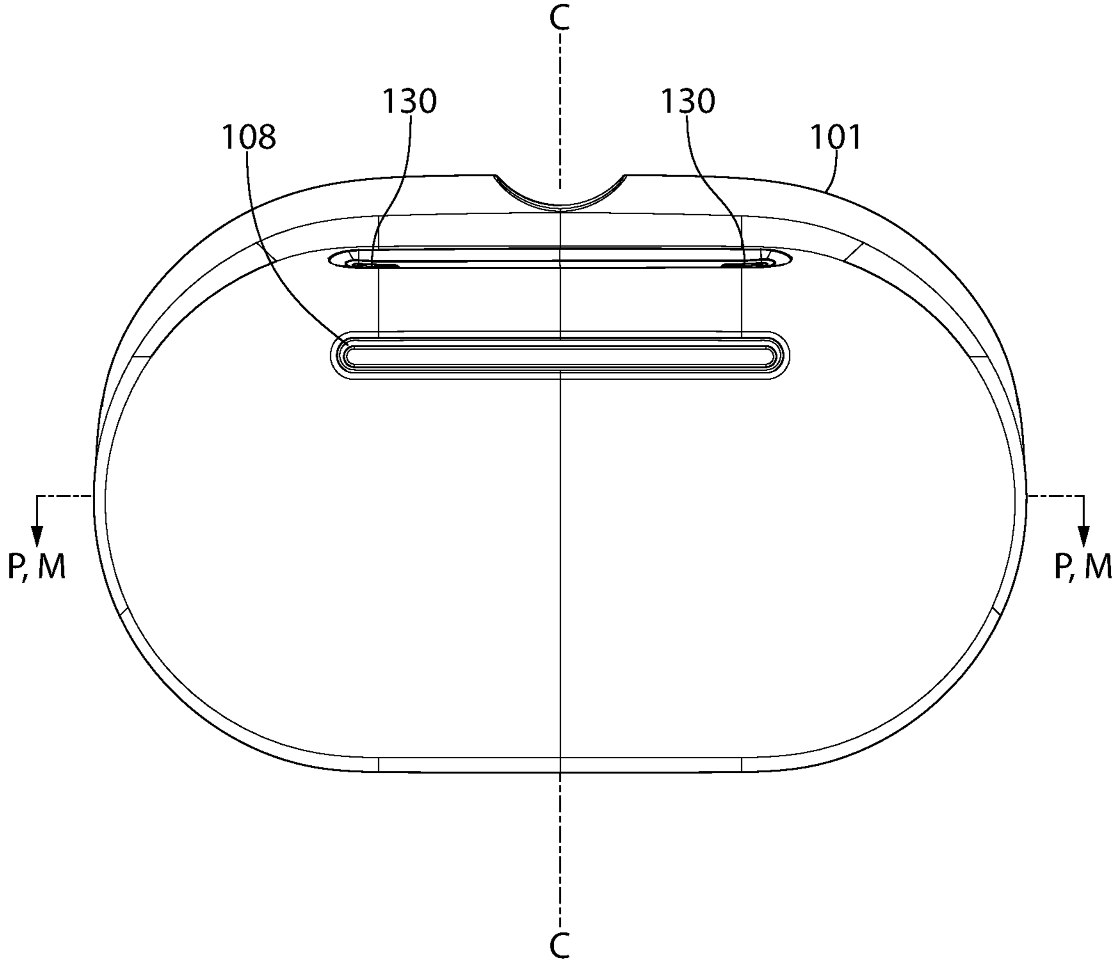
FIG. 19 is top view thereof.
Figure 20:
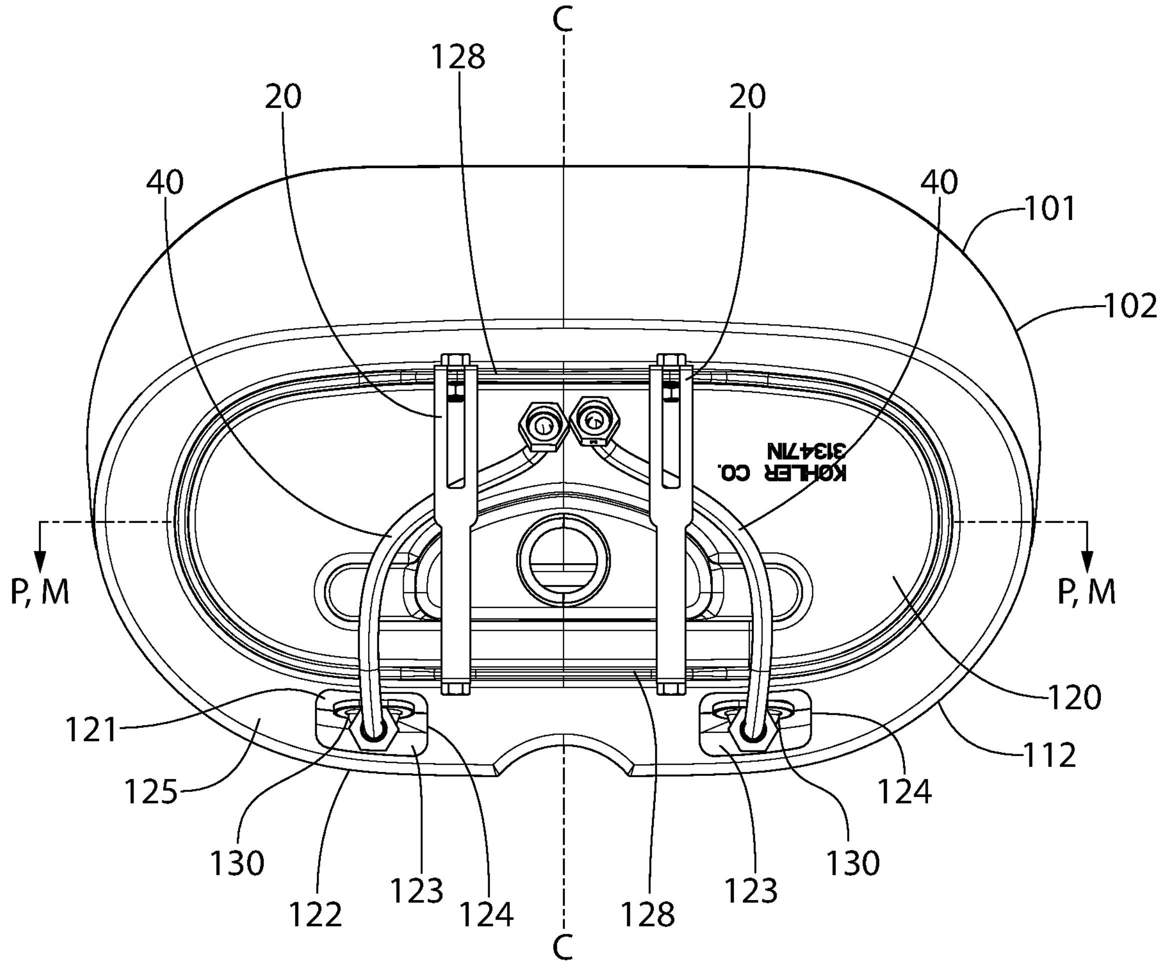
FIG. 20 is a bottom view thereof.
Figure 21:
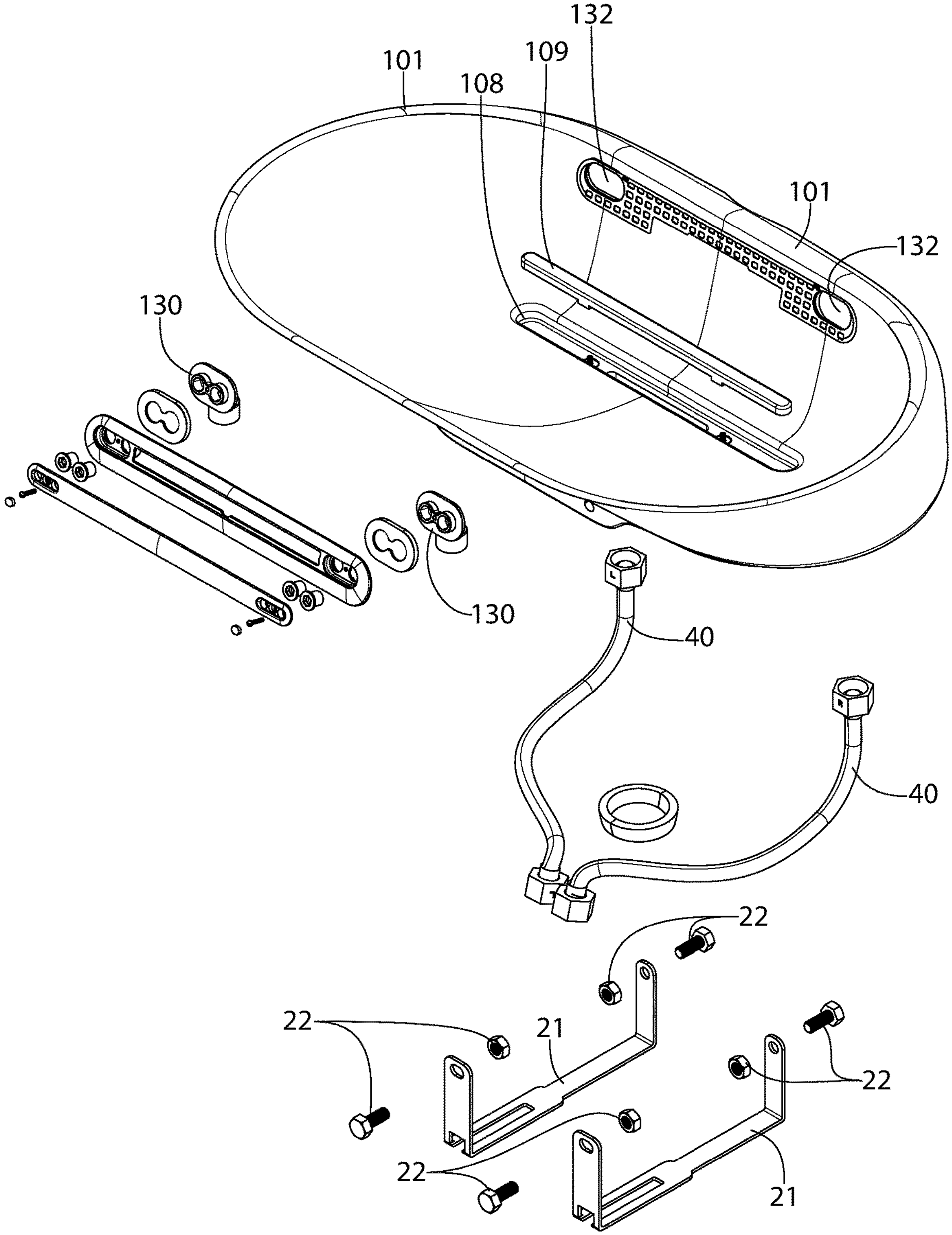
FIG. 21 is an exploded view thereof.
Figure 22:
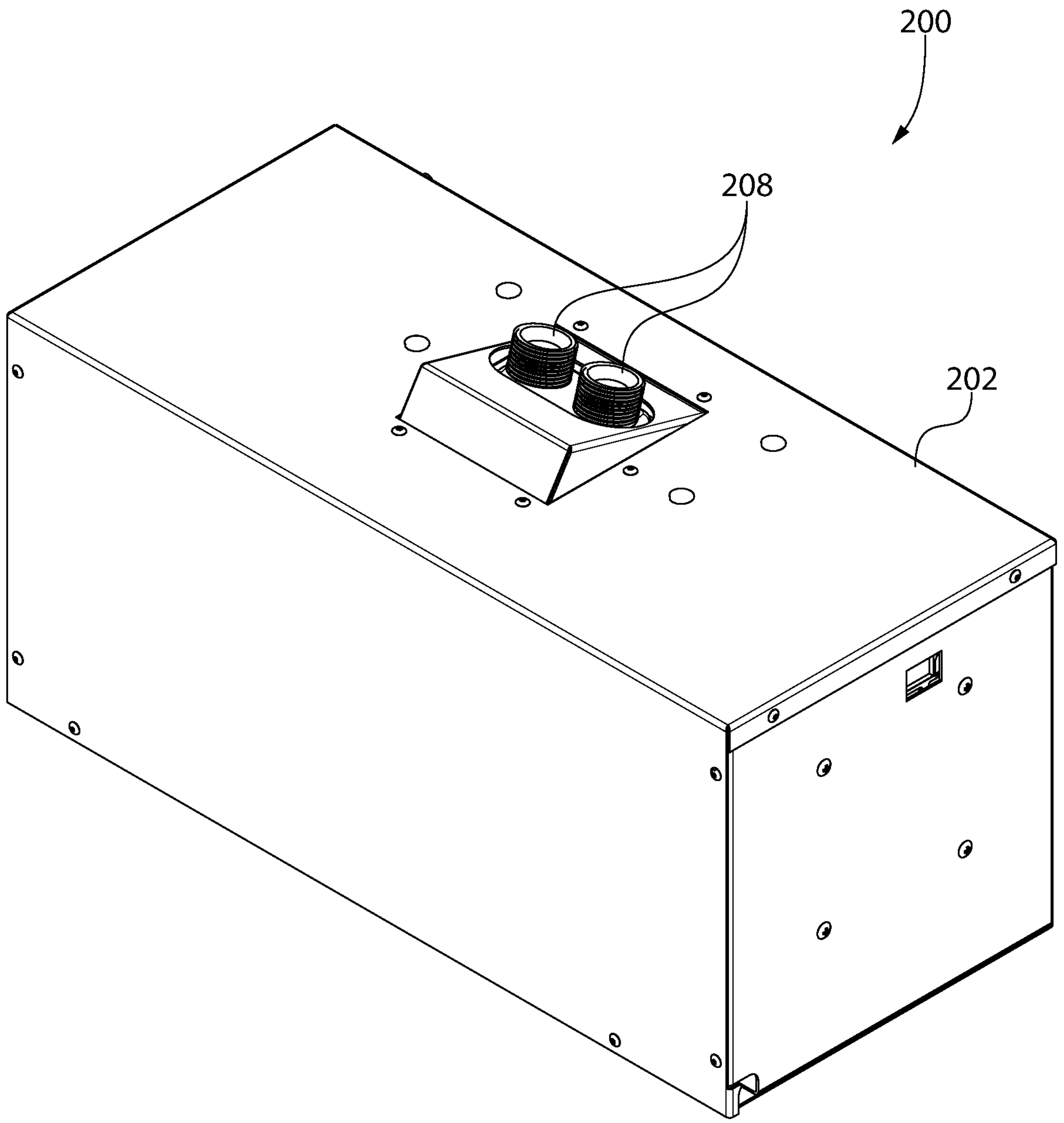
FIG. 22 is a perspective view of the steam generator of the washbasin of FIG. 1.
Figure 23:
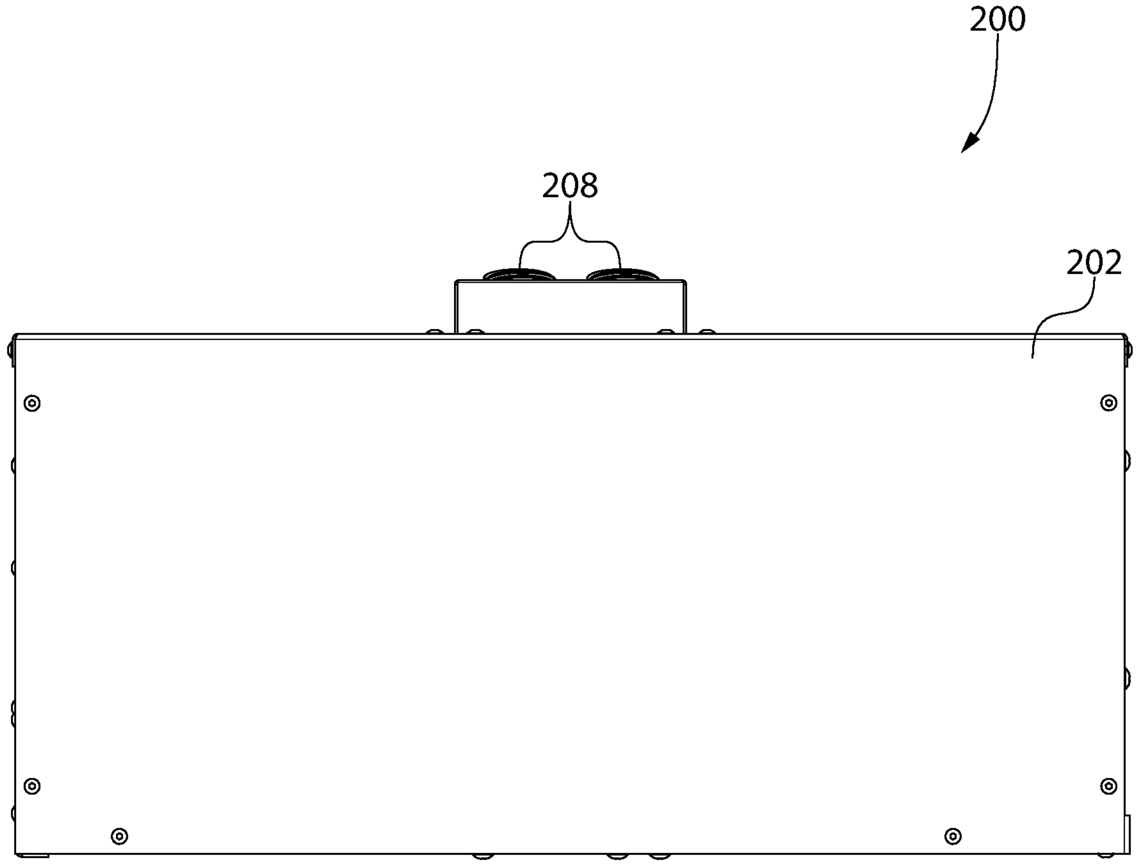
FIG. 23 is a front view thereof.
Figure 24:
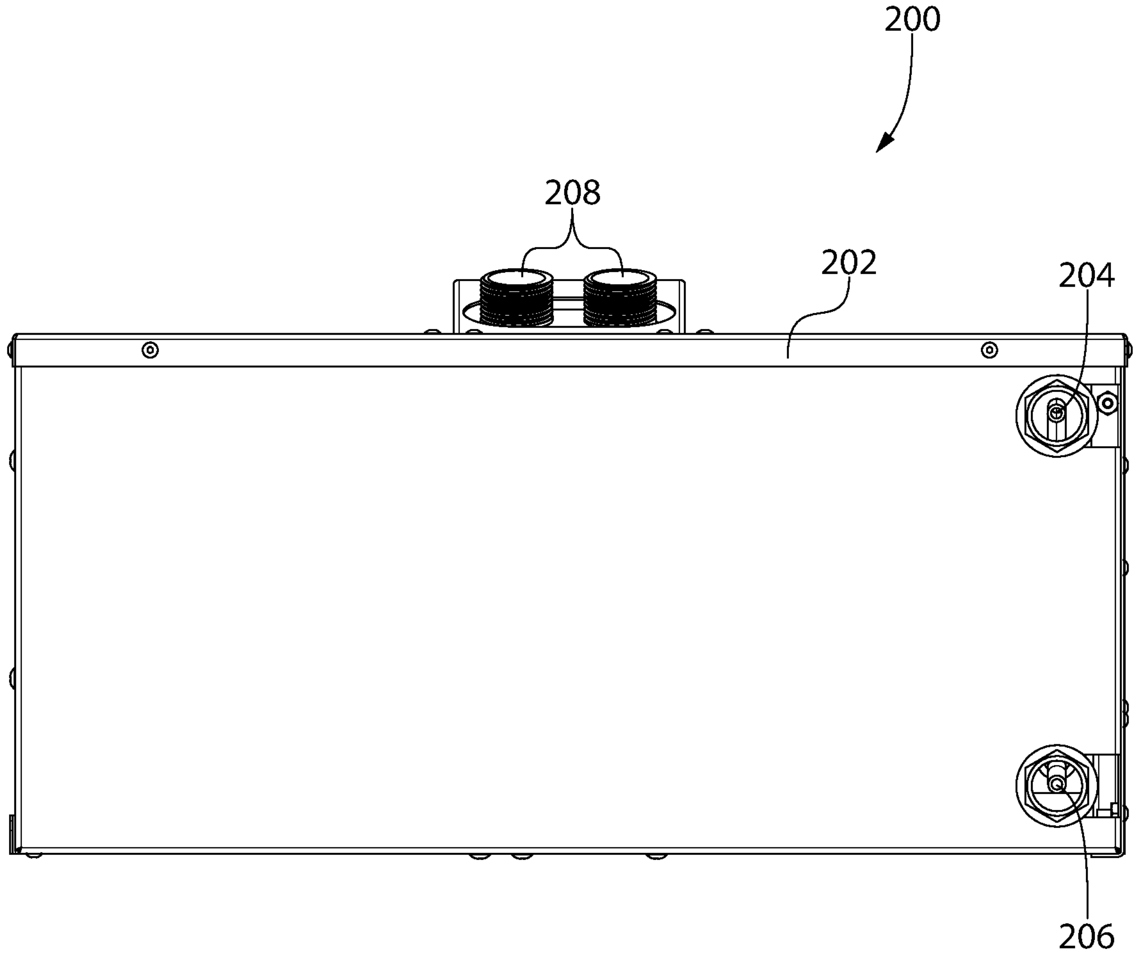
FIG. 24 is a rear view thereof.
Figure 25:
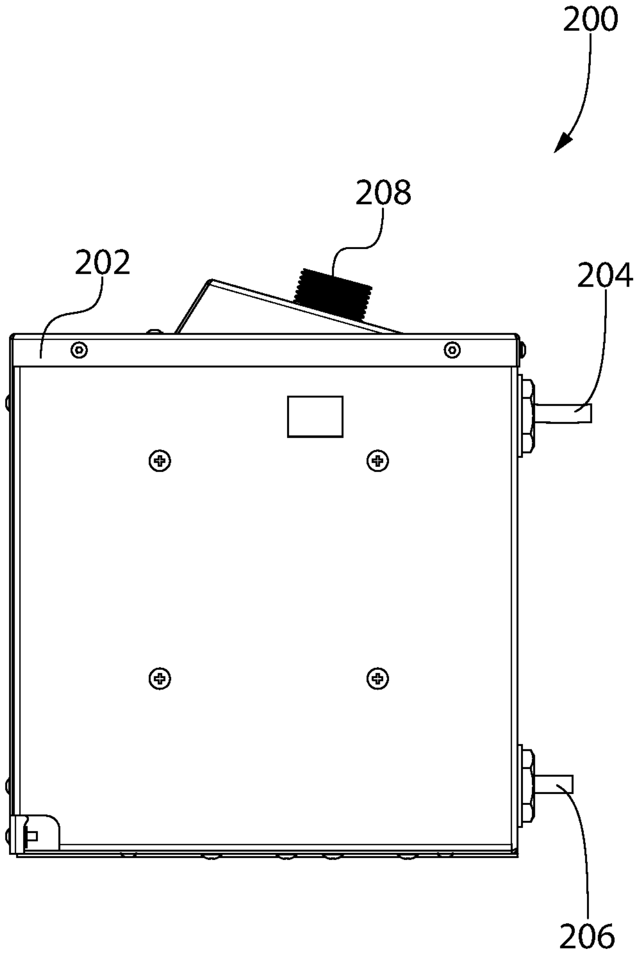
FIG. 25 is a right view thereof.
Figure 26:
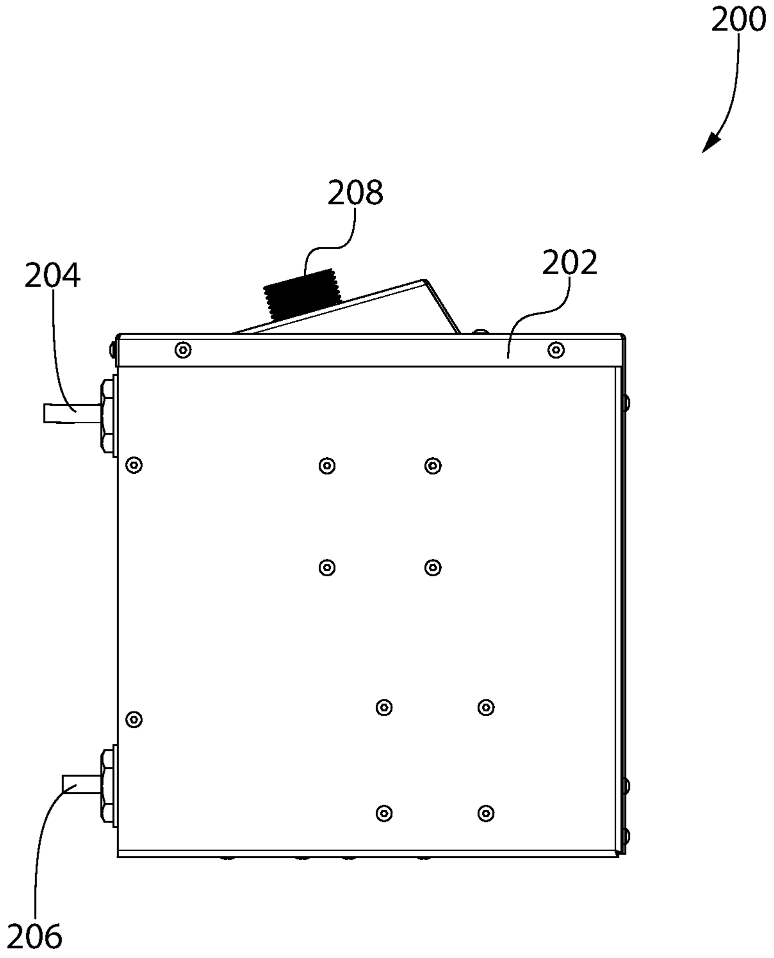
FIG. 26 is a left view thereof.
Figure 27:
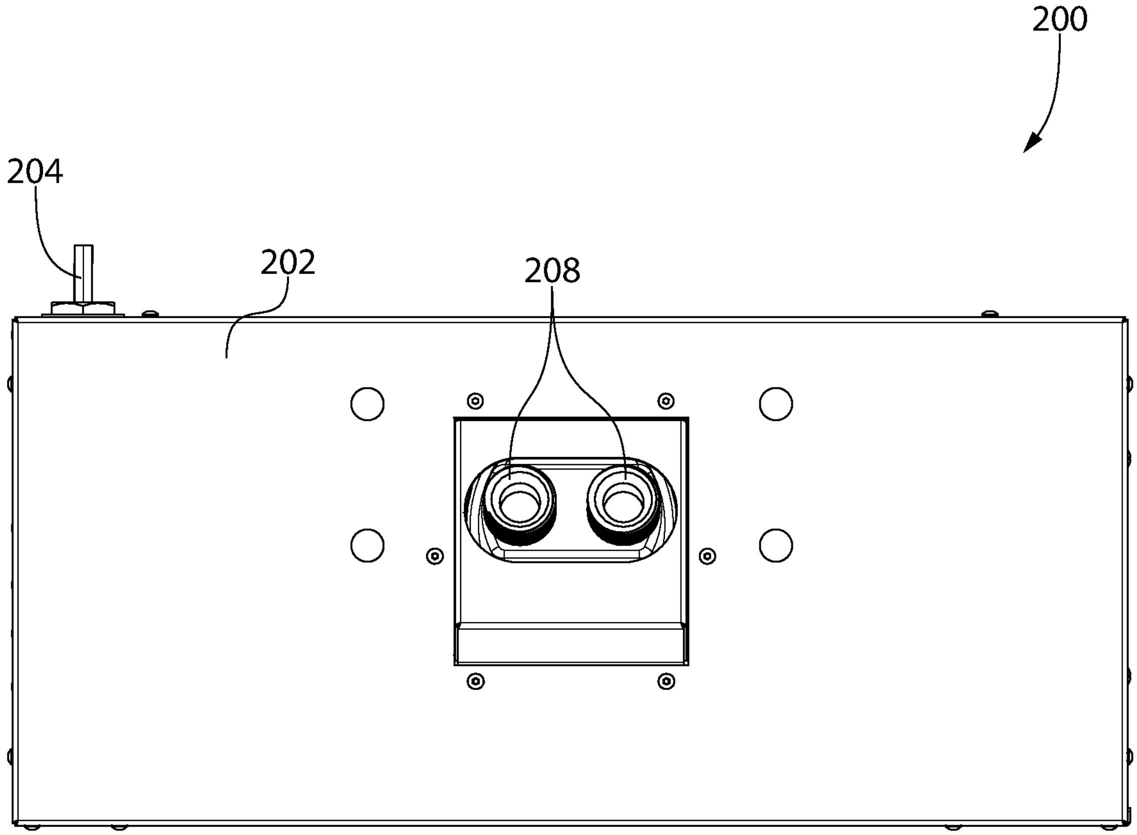
FIG. 27 is top view thereof.
Figure 28:
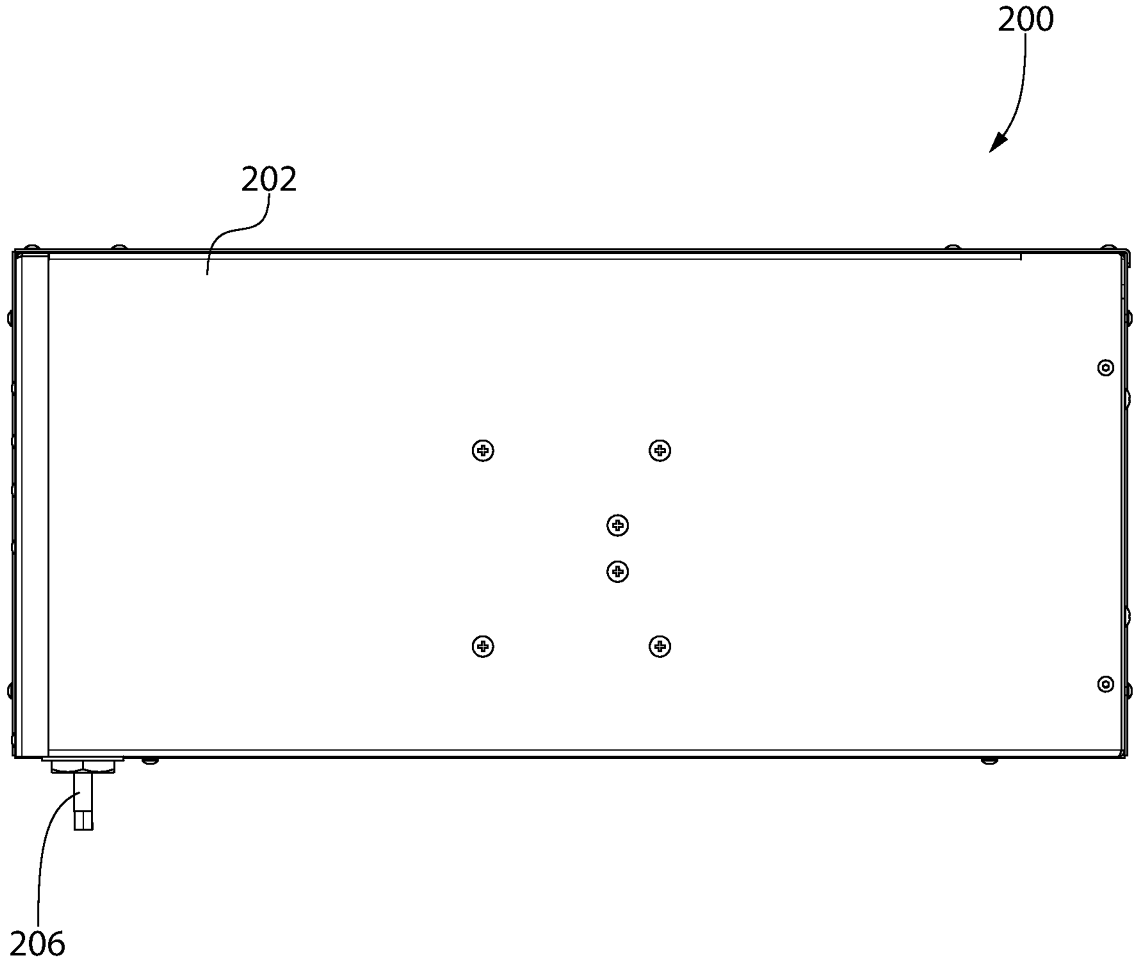
FIG. 28 is a bottom view thereof.

FIG. 9 is a schematic illustrating both fluid and electrical connections made with the steam generator 200. Connections made in solid lines indicate fluid connections while connections made in dotted lines indicate electrical connections via a wire, bus, or other means. The dotted lines may carry electrical power, signals, or a combination of the two.

The steam generator 200 has a tank 210, first and second heaters 220, and a printed circuit board (or "PCB") 230. The tank 210 further incorporates a low water level sensor 212 and a high water level sensor 214. An inlet 235 supplies water to a faucet 237 and the tank 210 via a water supply line 239, the water supply line having an angle valve 238 fluidly coupled to the inlet 237. The angle valve 238 is also fluidly coupled to the faucet 237 via a tee or other component in the water supply line 239, the faucet 237 being downstream of the angle valve 238 in the water supply line 239. The angle valve 238 permits manual operation by a user or service technician to shut off water to the faucet 237 and the steam generator 200.

A first solenoid valve 234 is also fluidly connected to the water supply line 239 downstream of the angle valve 238, the first solenoid valve 234 being electrically operated to open and close, allowing water to flow to the tank 210 when the first solenoid valve 234 is in an open state and preventing water from flowing to the tank 210 when the first solenoid valve 234 is in a closed state. As can be seen, the tank 210 is fluidly coupled to the first solenoid valve 234 via the water supply line 239. The water inlet 204 of the steam generator may preferably be located along the water supply line 239 between the tee for the faucet 237 and the first solenoid valve 234. However, in other implementations, the first solenoid valve 234 may be located external to the housing 202 and may be upstream of the water inlet 204. In the present implementation, the first solenoid valve 234 is a normally closed valve, but in other implementations the first solenoid valve 234 may be a normally open valve.

In addition, a water drain line 240 fluidly couples the tank 210 to a second solenoid valve 234 then on to an outlet 236 which is fluidly coupled to a drain pipe, sewer line, or the like. The second solenoid valve 234 is also electrically operated to open and close, allowing water to flow from the tank 210 when the second solenoid valve 234 is in an open state and preventing water from flowing from the tank 210 when the second solenoid valve 234 is in a closed state. Preferably, the water outlet 206 is located at the outlet 236, though it may be differently located along the water drain line 240 if the second solenoid valve 234 is mounted external to the housing 202. In the present implementation, the second solenoid valve 234 is a normally closed valve, but in other implementations the second solenoid valve 234 may be a normally open valve.

A third solenoid valve 232 is also fluidly coupled to the tank 210. The third solenoid valve 232 is a three port solenoid valve, with a first port connected to the tank 210, a second port connected to atmosphere, and a third port connected to the water drain line 240 and ultimately to the outlet 236. The third solenoid valve 232 is both normally open and normally closed. Stated differently, when the third solenoid valve 232 is in an inactive state, the first and second ports are fluidly coupled and the third port is not fluidly coupled to either of the first or second ports. When the third solenoid valve 232 is in an active state, the first and third ports are fluidly coupled while the second port is not fluidly coupled to either of the first or third ports. In other implementations, the third solenoid valve 232 may be omitted, differently configured with respect to the ports being normally open and normally closed, or may be substituted for an air admittance valve, check valve, or other similar components.

The tank 210 may be selectively filled or emptied as determined by user input or other functions implemented on the PCB 230. The control panel 60 is electrically connected to the PCB 230 and allows for the transmission of user input to the PCB 230. In addition, the control panel 60 can receive and display output generated by the PCB 230. The control panel 60 may provide a variety of functions as discussed in greater detail below.

The tank 210 is fluidly connected to the heaters 220. The heaters 220 may have a water heating cavity to allow more efficient heating of the water for the purposes of steam generation. Instead of heating all water in the tank 210, only a portion of the water from the tank 210 may be heated, reducing the time to generate steam. Steam may exit via the generator steam outlets 208. Optionally, the PCB 230 may operate only one of the two heaters 220 at a time, generating steam from only one of the generator steam outlets 208.

The generator steam outlets 208 may be fluidly connected internal to the steam generator 200, ensuring that steam exits both first and second steam outlet conduits 40 and both basin steam outlets 130. In other implementations, the generator steam outlets 208 may not be fluidly connected, such that heat from a single heater 220 exits a single generator steam outlet 208 and there is no mixing of steam between generator steam outlets 208. Optionally, water may be flowed through the generator steam outlets 208 to flush out any dirt or debris that may enter the basin steam outlets 130, steam outlet conduits 40, or the steam generator 200.

Each of the heaters 220 may incorporate a temperature sensor 222 and a thermostat 224. The temperature sensor 222 may provide information to the PCB 230 on the current state of the water within the heater 220. The thermostat may be used to control the heat output of the heater 220 or the water flow into the heater 220 and may be controlled via the PCB 230 or may function via mechanical or other automatic means not reliant on control from the PCB 230. In yet other configurations, the steam generator 200 may further incorporate a dispenser which delivers essential oils or other aromatic liquids to the tank 210 so that they can be vaporized with the water in the tank 210, optimizing the steam experience provided by the washbasin.

Turning to FIGS. 10-13, the steam generator 200 is illustrated in greater detail. As discussed above, the steam generator 200 has a tank 210, two heaters 220, first, second, and third solenoid valves 232, 234, and a PCB 230. Generator steam outlets 208 deliver steam from the steam generator 200 while water is received via the water inlet 204. Water may exit via the water outlet 206. In other implementations, only a single heater 220 is utilized.

FIGS. 14-21 illustrate the basin 100, steam outlet conduits 40, and coupling elements 20 in greater detail. As can be seen, the basin 100 has a main body 101 that has a top edge 102, a top plane P-P extending along the top edge 102 as discussed above. The basin 100 further incorporates a drain 108 and cover 109 covering the drain 108. In addition, a plurality of basin steam outlets 130 are positioned symmetrically about a central plane C-C, above a mid-plane M-M, and below the top plane P-P.

The basin 100 has a cavity 106 which is bounded by an inner surface 110. The inner surface is defined by a rear wall 112, a front wall 114 opposite the rear wall 112, and left and right walls 116, 118. The rear, front, left, and right walls 112, 114, 116, 118 all meet at a floor 120. The drain 108 extends through the floor 120 to a drain outlet 111 that may be fluidly coupled to a sewer pipe or the like.

As discussed above, the rear wall 112 has a rear wall cavity 123 with apertures 124 provided in the rear wall cavity 123 and extending through a lower portion 125 of the rear wall 112. The apertures 124 extend through a lower portion 125 of the rear wall 112 and provide access to the inner wall portion 121. The rear wall 112 is formed such that the inner wall portion 121 joins the outer wall portion 122 at the top edge 102 of the basin 100. The steam outlet conduits 40 extend through the apertures 124 to deliver steam to the basin steam outlets 130.

The inner wall portion 121 and the outer wall portion 122 are also joined by the lower portion 125, the lower portion 125 opposite the top edge 102 of the basin 100. In other implementations, the rear wall 112 may be formed as a single wall with or without a lower portion 125. The basin steam outlets 130 are located within the rear wall cavity 123 and extend through the holes 132 of the basin 100. The holes 132 are formed through the inner wall portion 121, but do not extend through the outer wall portion 122 or the lower portion 125. The steam outlet conduits 40 extend through the apertures 124 into the rear wall cavity 123 and are coupled to the basin steam outlets 130 within the rear wall cavity 123.

Coupling elements 20 engage features in the basin 100 such as threaded holes, through holes, or the like, to allow coupling of the coupling elements 20 to the basin 100. These features are formed into tabs 128 extending from the floor 120 beneath the front wall 114 and rear wall 112. The tabs 128 may be integrally formed with the main body 101 of the basin 100 such that the main body 101 basin 100 is a single, unitary, integrally formed, monolithic component. The coupling elements 20 may be formed as brackets 21 and fasteners 22, the brackets 21 having one or more slots, one or more holes, or the like to accommodate the fasteners 22 and permit adjustable mounting of the coupling elements 20 to the basin 100 and the steam generator 200.

Turning to FIGS. 22-28, the steam generator 200 is illustrated. As discussed previously, the steam generator 200 has a housing 202 which is generally rectangular in shape. The housing 202 may be constructed of sheet metal or another sheet material such as plastic or a composite material. In yet other implementations, the housing 202 may be molded or otherwise formed to facilitate low cost of manufacture and high durability. The steam generator 200 has a water inlet 204, a water outlet 206, and steam outlets 208 as discussed above.

Figure 29:
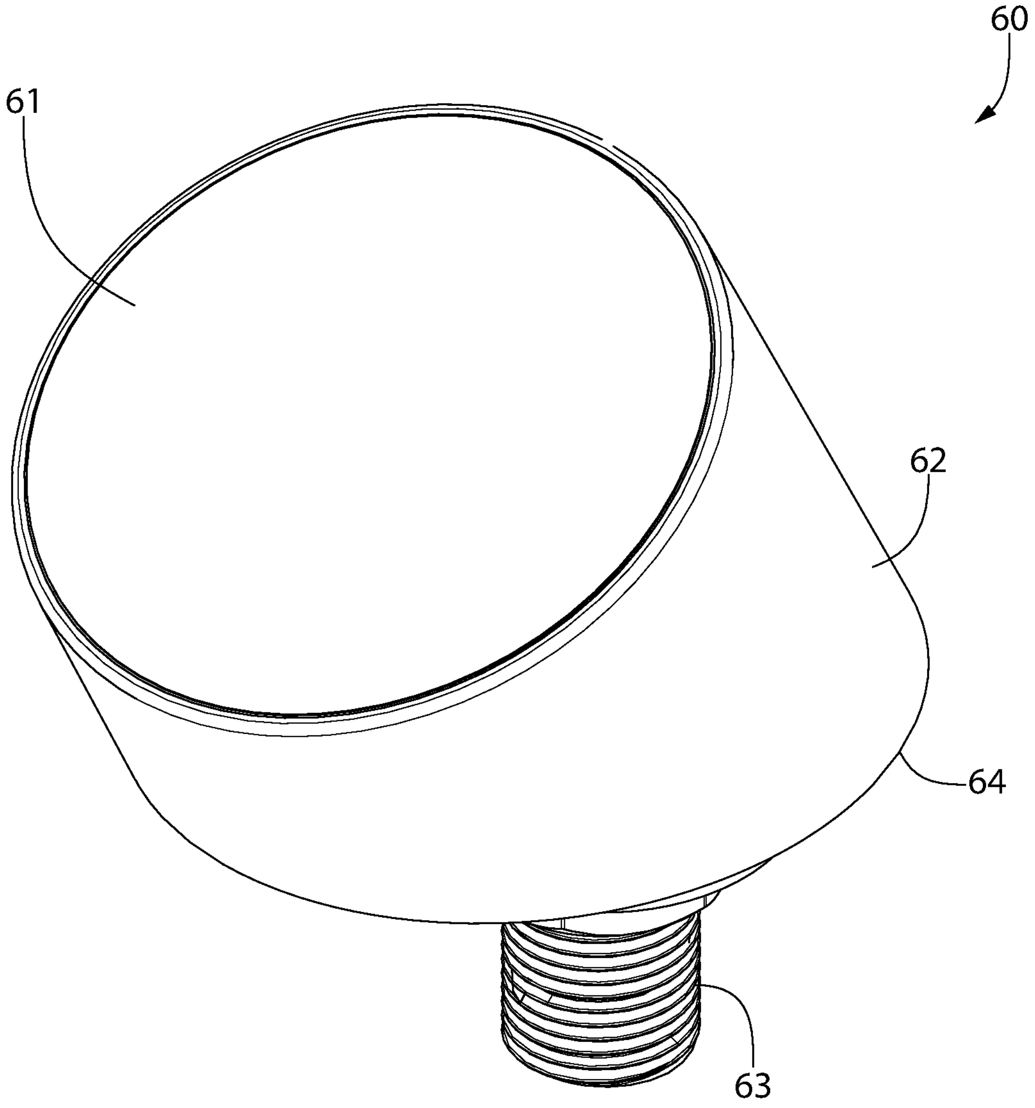
FIG. 29 is a perspective view of a control panel of the washbasin of FIG. 1.

Turning to FIG. 29, the control panel 60 is shown. The control panel 60 has a user interface portion 61, an upper housing portion 62, a mounting portion 63, and a base surface 64. The control panel 60 is configured for mounting such that it is spaced and isolated from the basin 100 and the steam generator 200. The user interface portion 61 may have one or more user input features such as buttons, sliders, switches, or the like. The user interface portion 61 may also incorporate display features such as lights, alphanumeric displays, or other features which can communicate information to the user.

The upper housing portion 62 covers the electronics required for the user interface portion 61, provides a clean aesthetic appearance, and protects the electronics from moisture. The upper housing portion 62 terminates in a base surface 64 which is configured to engage a horizontal surface such as a counter-top of a vanity or other support structure. The mounting portion 63 may be a threaded pipe or tube which, in combination with a nut or other securing device, may be used to securely clamp the control panel 60 to the support structure. In addition, the mounting portion 63 has a hollow passage which allows electrical wiring to pass therethrough, providing power transmission and communication functions to the control panel 60.

During use of the washbasin 10, the control panel 60 may be operated by the user in a variety of ways. For example, when the user powers on the washbasin 10, the washbasin 10 may perform self-test and self-check functions by operating the components in the washbasin 10, making measurements of sensor outputs, or measuring electrical characteristics of the components when they are operated. It is further contemplated that the washbasin 10 may have a self-cleaning function. The self-cleaning function may operate by flowing excess water into the tank 210 of the steam generator, and then continuing to flow water until water overflows the tank 210, and flows through the heaters 220. Water then runs out of the steam outlets 208, through the steam outlet conduits 40, and out of the basin steam outlets 130. This function can be utilized to clean the washbasin 10's internal components and ensure that no dirt, dust, or other debris or contamination is present in the system.

In other implementations, the washbasin 10 may allow a low mode or a high mode. In the low mode, the steam generator 200 is operated such that only one heater 220 is actively providing heat to generate steam. As noted above, the steam outlets 208 may be connected such that steam flows out of both of the steam outlets 208. In other implementations, the steam outlets 208 may be isolated from one another so that steam only flows from a single steam outlet 208. In some implementations, a different one of the heaters 220 is operated in the low mode. For example, the first heater 220 may be operated for a period of time or number of cycles of low mode operation, then the second heater 220 may be operated for a period of time or number of cycles of low mode operation. This serves to balance heater usage and ensure that one heater does not fail prematurely. In a high mode of operation, both heaters 220 may be operated simultaneously. Thus, the maximum steam output of the washbasin 10 is provided, delivering rapid steam generation and rapidly filling the room with steam.

In yet another operating mode, an auto-clean function allows the washbasin 10 to automatically clean itself. In one implementation, a button on the control panel 60 may be held for three seconds to activate the auto-clean function. In another implementation, auto-clean is activated upon initial power-up, at predetermined intervals, or upon receiving another input from the user. Upon activation of the auto-clean function, the washbasin may flow water into the tank 210, continuing to allow water to flow into the tank 210 for 30 seconds. No water is drained via the water drain line 240, so water flows through the heaters 220 and out of the steam outlets 208. Water is then flushed through the basin steam outlets 130, ensuring that the steam generator 200, steam outlet conduits 40, and basin steam outlets 130 are cleaned. During the 30 second flush period, water is delivered through the basin steam outlets 130, the volume of water being sufficient to ensure thorough cleaning.

As can be seen, the control panel 60 may have a power button, a sensitive mode button, a normal mode button, and an auto-clean button. The power button may be used to power on the washbasin 10. The sensitive mode button may activate the low mode described above. The normal button may activate the high mode described above. The auto-clean button may be used to activate the auto-clean function described above. Alternately, one or more buttons may have multiple functions. For instance, the power button may be used to operate the auto-clean function. Other configurations may be implemented as desired.

Exemplary Claim Set

Exemplary claim 1: A washbasin comprising a basin comprising a drain and a basin steam outlet; a steam generator, the steam generator comprising: a water inlet; a tank configured to store water received at the water inlet; a heater configured to heat the water to generate steam; and a generator steam outlet configured to output the steam; coupling elements which couple the steam generator to the basin; and a steam outlet conduit fluidly connecting the generator steam outlet to the basin steam outlet; wherein the basin steam outlet is located on a rear wall of the basin.

Exemplary claim 2: The washbasin of claim 1 wherein the steam generator is suspended from the basin.

Exemplary claim 3: The washbasin of claim 2 wherein the basin further comprises a front portion opposite the rear wall of the basin, the steam generator suspended beneath the front portion of the basin.

Exemplary claim 4: The washbasin of any one of claims 1 to 3 further comprising a second basin steam outlet, a second steam outlet conduit, and a second generator steam outlet, the second steam outlet conduit fluidly connecting the second generator steam outlet to the second basin steam outlet.

Exemplary claim 5: The washbasin of claim 4 further comprising a central plane, the basin being symmetric about the central plane, and wherein the steam outlet conduit and the second steam outlet conduit are symmetrical about the central plane.

Exemplary claim 6: The washbasin of claim 4 or claim 5 wherein the generator steam outlet and the second generator steam outlet are fluidly coupled within the steam generator.

Exemplary claim 7: The washbasin of any one of claims 1 to 6 wherein the basin comprises a hole extending through the rear wall of the basin, the hole receiving the basin steam outlet.

Exemplary claim 8: The washbasin of any one of claims 1 to 7 wherein the basin steam outlet is located above a mid-plane, the mid-plane extending parallel to a top edge of the basin and located halfway between the top edge of the basin and the drain.

Exemplary claim 9: The washbasin of any one of claims 1 to 8 wherein the steam generator comprises a second heater, the steam generator configured to operate in a low mode where the heater is operated and a high mode where both the heater and the second heater are operated.

Exemplary claim 10: The washbasin of any one of claims 1 to 9 wherein the washbasin comprises a control panel, the control panel spaced and isolated from the basin and the steam generator.

Exemplary claim 11: A method of generating steam, the method comprising: providing a washbasin, the washbasin comprising a basin and a steam generator coupled to the basin; generating steam within the steam generator; transmitting steam from a generator steam outlet of the steam generator to a basin steam outlet via a steam outlet conduit, the basin steam outlet positioned on a rear wall of the basin.

Exemplary claim 12: The method of claim 11 wherein the step of transmitting further comprises transmitting steam from a second generator steam outlet of the steam generator to a second basin steam outlet via a second steam outlet conduit.

Exemplary claim 13: The method of claim 12 wherein the basin further comprises a central plane, the basin being symmetric about the central plane, and wherein the steam outlet conduit and the second steam outlet conduit are symmetrical about the central plane.

Exemplary claim 14: The method of claim 12 or claim 13 wherein the generator steam outlet and the second generator steam outlet are fluidly coupled within the steam generator.

Exemplary claim 15: The method of any one of claims 11 to 14 wherein the steam generator is configured to operate in a low mode and a high mode, the low mode generating a first volume flow rate of steam and the high mode generating a second volume flow rate of steam, the first volume flow rate being less than the second volume flow rate.

Exemplary claim 16: A washbasin comprising: a basin comprising a drain, a basin steam outlet, a front portion, and a rear portion, wherein the front portion and the rear portion located on opposite sides of the drain; a steam generator, the steam generator comprising: a water inlet; a tank configured to store water received at the water inlet; a heater configured to heat the water to generate steam; and a generator steam outlet configured to output the steam; coupling elements which couple the steam generator to the basin; and a steam outlet conduit fluidly connecting the generator steam outlet to the basin steam outlet; wherein the steam generator is suspended beneath the front portion of the basin by the coupling elements, the steam outlet conduit extending from beneath the front portion of the basin to the basin steam outlet.

Exemplary claim 17: The washbasin of claim 16 wherein the coupling elements comprise a first bracket, a second bracket, and a plurality of fasteners.

Exemplary claim 18: The washbasin of claim 17 wherein the coupling elements are directly coupled to the basin and to the steam generator.

Exemplary claim 19: The washbasin of any one of claims 16 to 18 wherein the basin steam outlet is located above a mid-plane, the mid-plane extending parallel to a top edge of the basin and located halfway between the top edge of the basin and the drain.

Exemplary claim 20: The washbasin of any one of claims 16 to 19 wherein the basin further comprises a rear wall, the basin steam outlet located on the rear wall of the basin.

While the foregoing description and drawings represent examples of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants of the invention, which may be made by those skilled in the art without departing from the scope and range of equivalents of the invention.

What is claimed is:

1. A washbasin comprising:
- a basin comprising a drain and a basin steam outlet;
- a steam generator, the steam generator comprising:
  - a water inlet;
  - a tank configured to store water received at the water inlet;
  - a heater configured to heat the water to generate steam; and
  - a generator steam outlet configured to output the steam;
- coupling elements which couple the steam generator to the basin; and
- a steam outlet conduit fluidly connecting the generator steam outlet to the basin steam outlet;
- wherein the basin steam outlet is located on a rear wall of the basin.

2. The washbasin of claim 1 wherein the steam generator is suspended from the basin.

3. The washbasin of claim 2 wherein the basin further comprises a front portion opposite the rear wall of the basin, the steam generator suspended beneath the front portion of the basin.

4. The washbasin of claim 1 further comprising a second basin steam outlet, a second steam outlet conduit, and a second generator steam outlet, the second steam outlet conduit fluidly connecting the second generator steam outlet to the second basin steam outlet.

5. The washbasin of claim 4 further comprising a central plane, the basin being symmetric about the central plane, and wherein the steam outlet conduit and the second steam outlet conduit are symmetrical about the central plane.

6. The washbasin of claim 4 wherein the generator steam outlet and the second generator steam outlet are fluidly coupled within the steam generator.

7. The washbasin of claim 1 wherein the basin comprises a hole extending through the rear wall of the basin, the hole receiving the basin steam outlet.

8. The washbasin of claim 1 wherein the basin steam outlet is located above a mid-plane, the mid-plane extending parallel to a top edge of the basin and located halfway between the top edge of the basin and the drain.

9. The washbasin of claim 1 wherein the steam generator comprises a second heater, the steam generator configured to operate in a low mode where the heater is operated and a high mode where both the heater and the second heater are operated.

10. The washbasin of claim 1 wherein the washbasin comprises a control panel, the control panel spaced and isolated from the basin and the steam generator.

11. A method of generating steam, the method comprising:
- providing a washbasin, the washbasin comprising a basin and a steam generator coupled to the basin;
- generating steam within the steam generator;
- transmitting steam from a generator steam outlet of the steam generator to a basin steam outlet via a steam outlet conduit, the basin steam outlet positioned on a rear wall of the basin.

12. The method of claim 11 wherein the step of transmitting further comprises transmitting steam from a second generator steam outlet of the steam generator to a second basin steam outlet via a second steam outlet conduit.

13. The method of claim 12 wherein the basin further comprises a central plane, the basin being symmetric about the central plane, and wherein the steam outlet conduit and the second steam outlet conduit are symmetrical about the central plane.

14. The method of claim 12 wherein the generator steam outlet and the second generator steam outlet are fluidly coupled within the steam generator.

15. The method of claim 11 wherein the steam generator is configured to operate in a low mode and a high mode, the low mode generating a first volume flow rate of steam and the high mode generating a second volume flow rate of steam, the first volume flow rate being less than the second volume flow rate.

16. A washbasin comprising:
- a basin comprising a drain, a basin steam outlet, a front portion, and a rear portion, wherein the front portion and the rear portion located on opposite sides of the drain;
- a steam generator, the steam generator comprising:
  - a water inlet;
  - a tank configured to store water received at the water inlet;
  - a heater configured to heat the water to generate steam; and
  - a generator steam outlet configured to output the steam;
- coupling elements which couple the steam generator to the basin; and
- a steam outlet conduit fluidly connecting the generator steam outlet to the basin steam outlet;
- wherein the steam generator is suspended beneath the front portion of the basin by the coupling elements, the steam outlet conduit extending from beneath the front portion of the basin to the basin steam outlet.

17. The washbasin of claim 16 wherein the coupling elements comprise a first bracket, a second bracket, and a plurality of fasteners.

18. The washbasin of claim 17 wherein the coupling elements are directly coupled to the basin and to the steam generator.

19. The washbasin of claim 16 wherein the basin steam outlet is located above a mid-plane, the mid-plane extending parallel to a top edge of the basin and located halfway between the top edge of the basin and the drain.

20. The washbasin of claim 16 wherein the basin further comprises a rear wall, the basin steam outlet located on the rear wall of the basin.

* * * * *